United States Patent
Takahashi et al.

(10) Patent No.: US 9,863,759 B2
(45) Date of Patent: Jan. 9, 2018

(54) ILLUMINATION APPARATUS, PATTERN IRRADIATION DEVICE, AND SYSTEM

(71) Applicants: Tatsuya Takahashi, Tokyo (JP);
Kazuhiro Fujita, Tokyo (JP);
Toshiharu Murai, Kanagawa (JP);
Takehiro Nishimori, Kanagawa (JP);
Takahiro Kado, Kanagawa (JP); Jun Kishiwada, Kanagawa (JP)

(72) Inventors: Tatsuya Takahashi, Tokyo (JP);
Kazuhiro Fujita, Tokyo (JP);
Toshiharu Murai, Kanagawa (JP);
Takehiro Nishimori, Kanagawa (JP);
Takahiro Kado, Kanagawa (JP); Jun Kishiwada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 123 days.

(21) Appl. No.: 14/879,427

(22) Filed: Oct. 9, 2015

(65) Prior Publication Data
US 2016/0109221 A1   Apr. 21, 2016

(30) Foreign Application Priority Data

Oct. 17, 2014  (JP) ................................ 2014-212747
Mar. 16, 2015  (JP) ................................ 2015-052453

(51) Int. Cl.
*G01B 11/14*  (2006.01)
*G01B 11/25*  (2006.01)
(Continued)

(52) U.S. Cl.
CPC ............ *G01B 11/14* (2013.01); *B25J 9/1694* (2013.01); *F21V 3/049* (2013.01); *F21V 7/00* (2013.01);
(Continued)

(58) Field of Classification Search
CPC ...................................................... G01B 11/14
(Continued)

(56) References Cited

U.S. PATENT DOCUMENTS 5,102,227 A * 4/1992 Zwirner ............... G01B 11/024
356/446
6,023,367 A * 2/2000 Kurtz ........................ F21V 5/04
348/E5.049

(Continued)

FOREIGN PATENT DOCUMENTS

JP    2008-502096 A    1/2008
JP    2008-96777        4/2008
(Continued)

OTHER PUBLICATIONS

Office Action dated Oct. 4, 2016 in Japanese Patent Application No. 2015-052453.
(Continued)

*Primary Examiner* — Roy M Punnoose
(74) *Attorney, Agent, or Firm* — Oblon, McClelland, Maier & Neustadt, L.L.P.

(57) ABSTRACT

An illumination apparatus includes: a light emitting unit that outputs light; a light condensing unit that condenses the light output from the light emitting unit; a diffusion unit that diffuses the light condensed by the light condensing unit; and a uniformizing optical system that receives the light diffused by the diffusion unit, uniformizes a brightness distribution thereof compared with that of the light being received, and outputs the resulting light.

20 Claims, 13 Drawing Sheets

(51) Int. Cl.
*B25J 9/16* (2006.01)
*F21V 3/04* (2006.01)
*F21V 7/00* (2006.01)
*F21Y 115/10* (2016.01)

(52) U.S. Cl.
CPC ....... *G01B 11/2545* (2013.01); *F21Y 2115/10* (2016.08); *Y10S 901/09* (2013.01)

(58) Field of Classification Search
USPC ........................................................ 356/614
See application file for complete search history.

(56) References Cited

U.S. PATENT DOCUMENTS

| | | | | |
|---|---|---|---|---|
| 6,542,179 | B1* | 4/2003 | Kurtz | G03B 27/542 348/96 |
| 7,077,525 | B2* | 7/2006 | Fischer | F21L 4/00 353/101 |
| 8,894,241 | B2 | 11/2014 | Kitano | |
| 9,179,106 | B2 | 11/2015 | Takayama et al. | |
| 9,207,522 | B2 | 12/2015 | Masuda et al. | |
| 2009/0296064 | A1* | 12/2009 | Cobb | G03F 7/70091 355/71 |
| 2011/0157353 | A1 | 6/2011 | Takayama et al. | |
| 2012/0154577 | A1 | 6/2012 | Yoshikawa | |
| 2013/0088471 | A1 | 4/2013 | Kitano | |
| 2013/0101953 | A1* | 4/2013 | Stone | F21V 29/004 433/29 |
| 2014/0063808 | A1* | 3/2014 | Kajiyama | G02B 27/48 362/259 |
| 2014/0078472 | A1 | 3/2014 | Masuda et al. | |
| 2014/0293232 | A1 | 10/2014 | Tanaka | |
| 2016/0109221 | A1* | 4/2016 | Takahashi | G01B 11/2545 356/614 |

FOREIGN PATENT DOCUMENTS

| | | |
|---|---|---|
| JP | 2011-65770 A | 3/2011 |
| JP | 2011-137753 A | 7/2011 |
| JP | 2012-027052 | 2/2012 |
| JP | 2013-076902 | 4/2013 |
| JP | 2013-92752 A | 5/2013 |
| JP | 2013-190548 A | 9/2013 |
| JP | 2013-222056 | 10/2013 |
| JP | 2013-257162 | 12/2013 |
| JP | 2014-010181 | 1/2014 |
| JP | 2014-62951 A | 4/2014 |
| JP | 2014-139689 A | 7/2014 |
| JP | 2014-146037 | 8/2014 |

OTHER PUBLICATIONS

Extended Search Report dated Feb. 12, 2016 in European Patent Application No. 15189522.4.
Office Action dated Feb. 14, 2017 in Japanese Patent Application No. 2015-052453.

* cited by examiner

ILLUMINATION APPARATUS, PATTERN IRRADIATION DEVICE, AND SYSTEM

CROSS-REFERENCE TO RELATED APPLICATIONS

The present application claims priority to and incorporates by reference the entire contents of Japanese Patent Application No. 2014-212747 filed in Japan on Oct. 17, 2014 and Japanese Patent Application No. 2015-052453 filed in Japan on Mar. 16, 2015.

BACKGROUND OF THE INVENTION

1. Field of the Invention

The present invention relates to an illumination apparatus, a pattern irradiation device, and a system.

2. Description of the Related Art

Conventionally, systems are known that use robots to handle objects (works) loaded on a tray, convey the objects to a device in the next process, and assemble products by using the objects. In such systems, a three-dimensional measuring device is used to measure the distance to an object on the tray, and the object is handled by recognizing the position and the posture thereof based on the measurement results. In such systems, a pattern irradiation device irradiates the objects on the tray with light in a predetermined pattern, thereby improving the accuracy of distance measurement performed by the three-dimensional measuring device (refer to Japanese Laid-open Patent Publication No. 2013-222056 and Japanese Laid-open Patent Publication No. 2013-257162, for example). The pattern irradiation device can be achieved by a configuration similar to that of a projection apparatus (projector) using a digital mirror device (DMD), a liquid crystal panel, or the like. Other conventional examples are described in Japanese Laid-open Patent Publication No. 2014-010181 and Japanese Laid-open Patent Publication No. 2013-076902.

Because the optical system of the projector using the DMD or the liquid crystal panel includes a relay optical system and an optical system used to combine respective colors, it has a number of components. Accordingly, the pattern irradiation device having a configuration similar to that of the projector is large in size and is expensive.

In view of the above, there is a need to provide an illumination apparatus, a pattern irradiation device, and a system that can obtain high optical output as well as reduce the size and the cost.

SUMMARY OF THE INVENTION

It is an object of the present invention to at least partially solve the problems in the conventional technology.

An illumination apparatus includes: a light emitting unit that outputs light; a light condensing unit that condenses the light output from the light emitting unit; a diffusion unit that diffuses the light condensed by the light condensing unit; and a uniformizing optical system that receives the light diffused by the diffusion unit, uniformizes a brightness distribution thereof compared with that of the light being received, and outputs the resulting light.

An illumination apparatus includes: a light emitting unit that outputs light; a light condensing unit that condenses the light output from the light emitting unit; a fluorescent unit that emits light by using the light condensed by the light condensing unit as excitation light; and a uniformizing optical system that receives the light emitted by the fluorescent unit, uniformizes a brightness distribution thereof compared with that of the light being received, and outputs the resulting light.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A handling system 10 according to embodiments of the present invention will now be described in detail below with reference to the accompanying drawings.

First Embodiment

Figure 1:
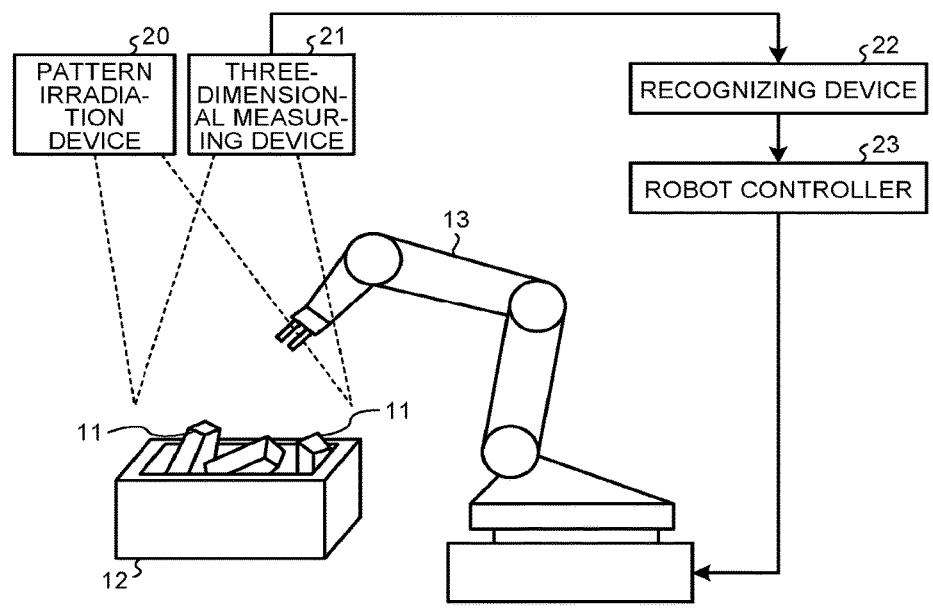
FIG. 1 is a schematic diagram of a handling system according to a first embodiment of the present invention.

FIG. 1 is a schematic diagram of the handling system 10 according to a first embodiment of the present invention. The handling system 10 handles objects 11 (works), conveys the objects 11 to a device in the next process, and assembles products by using the objects 11.

The handling system 10 includes a tray 12, a robot 13, a pattern irradiation device 20, a three-dimensional measuring device 21, a recognizing device 22, and a robot controller 23. At least one object 11 is loaded on the tray 12.

The robot 13 handles one of the objects 11 loaded on the tray 12 by moving an arm, and moves the handled object 11 to a specified position or holds it in a specified posture. The robot 13 may handle the object 11 by opening and closing claws and holding the object 11 therebetween, handle the object 11 by air suction, or handle the object 11 by electromagnetic force.

The pattern irradiation device 20 irradiates the tray 12, on which the objects 11 are loaded, with monochromatic light in a predetermined image pattern. Accordingly, the exposed surface of each of the objects 11 loaded on the tray 12 is irradiated with a predetermined image pattern. In the present embodiment, the pattern irradiation device 20 emits blue light in an image pattern. However, the color is not limited to blue but may be any color. It may also be white.

The three-dimensional measuring device 21, while the pattern irradiation device 20 is emitting light in a predetermined image pattern, measures the distance to each position of the exposed surface of each object 11 loaded on the tray 12. The three-dimensional measuring device 21, for example, measures the distance by using a stereo camera, and generates three-dimensional information showing the distance to the respective positions in the image.

The recognizing device 22 recognizes the position and the posture of each of the objects 11, based on the distance to each position of the surface of each object 11 measured by the three-dimensional measuring device 21. The recognizing device 22, for example, recognizes the position and the posture of the respective objects 11 by executing a matching process such as three-dimensional model matching or surface matching. The recognizing device 22 may also complement the matching process by performing edge extraction and the like based on brightness information.

The robot controller 23 controls the operation of the robot 13 based on the position and the posture of the respective objects 11 recognized by the recognizing device 22, according to a pre-registered control flow. The robot controller 23 then controls the robot to handle the specified object 11 on the tray 12.

In the handling system 10 configured in this manner, the pattern irradiation device 20 irradiates the respective objects 11 loaded on the tray 12 with light in an image pattern so as to improve the accuracy of the three-dimensional measurement performed by the three-dimensional measuring device 21. Accordingly, the handling system 10 can accurately recognize the position and the posture of the respective objects 11 loaded on the tray 12, and accurately handle the object 11.

Figure 2:
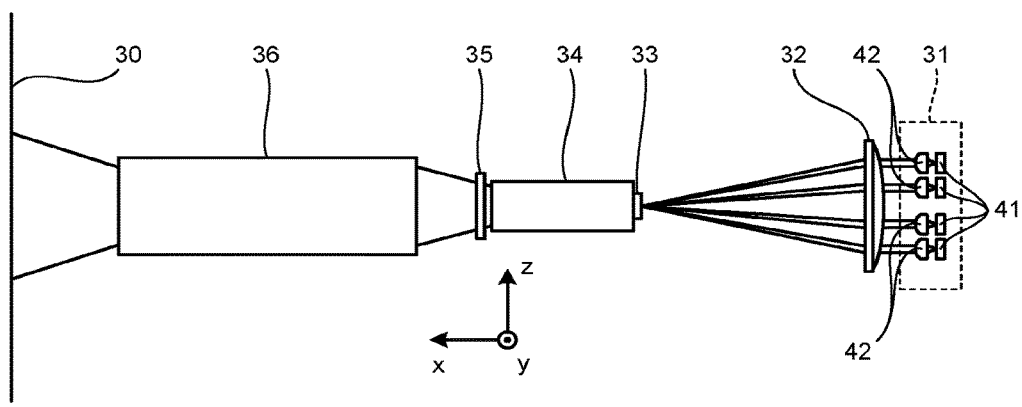
FIG. 2 is a schematic diagram illustrating the configuration of a pattern irradiation device according to the first embodiment.

FIG. 2 is a schematic diagram illustrating the configuration of the pattern irradiation device 20 according to the first embodiment. The pattern irradiation device 20 irradiates a projection plane 30 with light in an image pattern so as to improve the accuracy of distance measurement performed by the three-dimensional measuring device 21. The projection plane 30 corresponds to the tray 12 on which the objects 11 are loaded in the handling system 10.

The pattern irradiation device 20 includes a light emitting unit 31, a light condensing unit 32, a transmission diffusion plate 33, a light tunnel 34, an image forming unit 35, and an irradiation optical system 36.

In the diagram, x, y, and z indicate directions orthogonal to one another. The x direction is a direction parallel to the optical axis of the light tunnel 34. The y direction is a direction perpendicular to the x direction. The z direction is a direction perpendicular to the x direction and the y direction.

The light emitting unit 31 outputs light. In the present embodiment, the light emitting unit 31 outputs a plurality of laser beams, which are parallel luminous fluxes, in the same direction.

The light emitting unit 31 includes a plurality of laser diodes 41, which are light sources, and a plurality of collimator lenses 42. The laser diodes 41 output laser beams, which are coherent light, in the same direction to one another. In the present embodiment, the respective laser diodes 41, for example, are blue laser diodes that emit blue laser beams having a wavelength equal to or more than 440 nm and equal to or less than 500 nm. The respective laser diodes 41 are not limited to blue but may be another color. As long as the three-dimensional measuring device 21 can detect the emitted light, the laser diodes 41 may output laser beams other than visible light.

The collimator lenses 42 are provided in one-to-one correspondence with the respective laser diodes 41. The respective collimator lenses 42 receive laser beams output from the corresponding laser diodes 41, and output them as parallel luminous fluxes. Accordingly, the light emitting unit 31 can output laser beams, which are parallel luminous fluxes, in the same direction.

The light condensing unit 32 condenses the light output from the light emitting unit 31 on the transmission diffusion plate 33. In the present embodiment, the light condensing unit 32 is a lens, and condenses the laser beams to substantially one point on the transmission diffusion plate 33.

The transmission diffusion plate 33 is a diffusion unit that diffuses the incident light. The transmission diffusion plate 33 is generally flat and for example, fine concaves and convexes are randomly formed on at least one of the flat surfaces. The transmission diffusion plate 33 receives the laser beams condensed by the light condensing unit 32, transmits and diffuses the incident light, and outputs the light to the light tunnel 34. The transmission diffusion plate 33, for example, diffuses the light at a diffusion angle of equal to or more than 5 degrees and equal to or less than 10 degrees of full width at half maximum.

The light tunnel 34 is a uniformizing optical system that uniformizes the brightness distribution of the transmitted light on a plane (y direction and z direction) perpendicular to the optical axis direction (x direction) compared with that of the incident light. The light tunnel 34 receives the light diffused by the transmission diffusion plate 33, transmits the incident light, uniformizes the brightness distribution thereof compared with that of the incident light, and outputs the resulting light.

The image forming unit 35 transmits and blocks (or reflects) the light output from the light tunnel 34 corresponding to a predetermined image pattern, and forms an image in a predetermined image pattern on a plane perpendicular to the optical axis. The light that has passed through the image forming unit 35 enters the irradiation optical system 36. The predetermined image pattern is a two-dimensional pattern that improves the accuracy of distance measurement when it is emitted to the object 11.

The image forming unit 35, for example, is a rectangular plate-like photo mask, which is a transparent plate such as a glass plate on which a predetermined image pattern is drawn. The image forming unit 35 may also be a plate-like transmission-type liquid crystal device that can form an image pattern transmitted by electrical signals. In this case, the image forming unit 35 can form an image pattern according to image data supplied from an external information processing device.

The irradiation optical system 36 enlarges the light transmitted through the image forming unit 35 with a specified magnification, and emits the resulting light on the projection plane 30.

Figure 3:
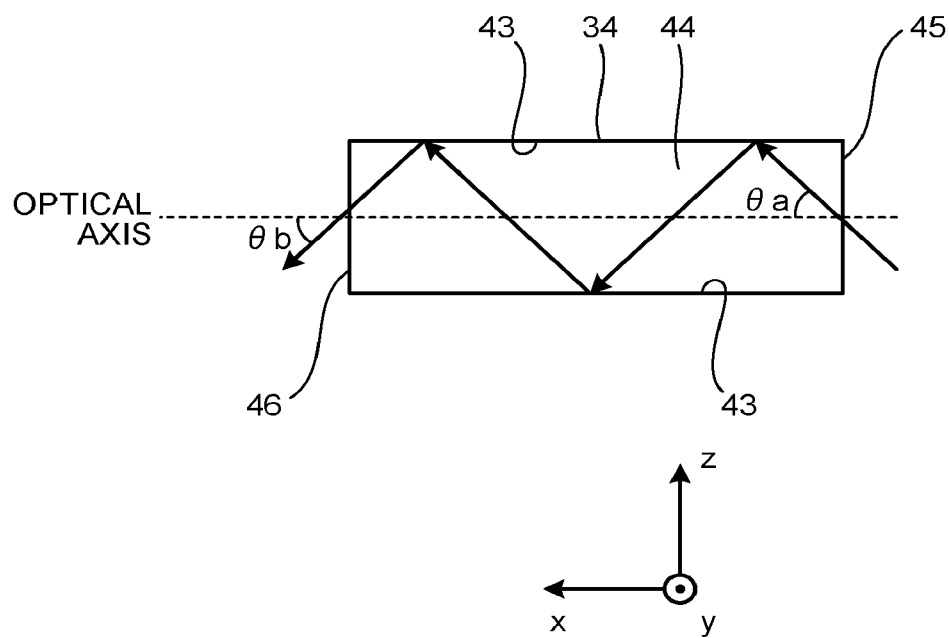
FIG. 3 is a schematic diagram illustrating an example of an optical path in a light tunnel.

FIG. 3 is a schematic diagram illustrating an example of an optical path in the light tunnel 34. The light tunnel 34, as illustrated in FIG. 3, is a cylinder having a reflecting side surface 43 that reflects light inward. The inside of the cylinder of the light tunnel 34 functions as an optical path 44 that passes the light through. As long as the light can pass through, the optical path 44 may be hollow or filled with a transparent member such as glass.

The light diffused by the transmission diffusion plate 33 enters the optical path 44 from an input port 45. The light passes through the optical path 44 while reflected off the reflecting side surface 43. The light that has passed through the optical path 44 is output to the outside from an output port 46. Because the light passes through the inside of the optical path 44 while reflecting off the reflecting side surface 43, the light tunnel 34 can uniformize the brightness distribution of the output light compared with that of the incident light.

The reflecting side surface 43 of the light tunnel 34 is provided parallel to the optical axis. Accordingly, an angle θa of light that enters the light tunnel 34 and an angle θb of light that outputs from the light tunnel 34 are the same. Consequently, the light tunnel 34 can output light having the same diffusion angle as that of the transmission diffusion plate 33.

In the present embodiment, the shape of the plane perpendicular to the optical axis direction (x direction) of the light tunnel 34 is rectangular. It is preferable that the shape of the plane perpendicular to the optical axis of the light tunnel 34 have substantially the same aspect ratio as that of the image forming unit 35.

The output port 46 of the light tunnel 34 should be large enough for the light to be emitted at least to the whole surface of the image forming unit 35 in the subsequent stage. However, if the output port 46 is larger than the image forming unit 35 in the subsequent stage, the output light will leak outside the image forming unit 35 and will be wasted. It is therefore preferable to configure the output port 46 substantially the same size as the image forming unit 35 by taking the assembly accuracy and the like into account.

A larger length of the light tunnel 34 in the optical axis direction increases the number of times the light is reflected in the optical path 44. This can further uniformize the brightness distribution, but also increase the loss. It is therefore preferable that the length of the light tunnel 34 in the optical direction be the minimum length by which intended uniformity can be obtained.

The light tunnel 34 may also be referred to as a homogenizer or a light pipe. The pattern irradiation device 20 may include another member instead of the light tunnel 34, as long as it is a uniformizing optical system. For example, the pattern irradiation device 20 may include a fly's-eye instead of the light tunnel 34.

Figure 4:
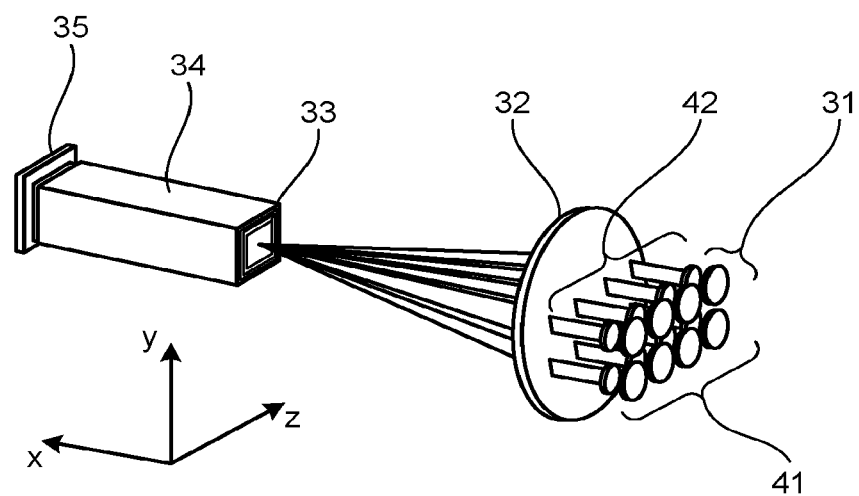
FIG. 4 is a partial perspective view of the pattern irradiation device according to the first embodiment.

FIG. 4 is a partial perspective view of the pattern irradiation device 20 according to the first embodiment. The light emitting unit 31, for example, includes eight laser diodes 41 arranged in a matrix of two rows and four columns. The light emitting unit 31 also includes eight collimator lenses 42 provided corresponding to the respective laser diodes 41. The light emitting unit 31 configured in this manner can output eight parallel luminous fluxes in the same direction.

In this manner, because the light emitting unit 31 includes multiple laser diodes 41, it can increase the energy of the output light. However, it is to be understood that the number and arrangement of the laser diodes 41 in the light emitting unit 31 may be of any number and arrangement, as long as the laser beams can be emitted in the same direction.

The transmission diffusion plate 33 is arranged immediately before the light tunnel 34 without a relay optical system or the like interposed therebetween. This enables the pattern irradiation device 20 to shorten the optical distance between the transmission diffusion plate 33 and the light tunnel 34 and can prevent the diffused light from leaking outside the light tunnel 34. Accordingly, the pattern irradiation device 20 can increase the light transmission efficiency as well as increasing the output energy.

The light condensing unit 32 condenses the laser beams output from the light emitting unit 31 on the transmission diffusion plate 33. Consequently, even when the number of laser diodes 41 in the light emitting unit 31 is increased, the light output from the laser diodes 41 enters the light tunnel 34 without any leakage. Thus, the pattern irradiation device 20 can easily increase the output energy.

The laser beams also have high rectilinearity. Consequently, when the light tunnel 34 receives the laser beams output from the collimator lenses 42 directly, it is difficult for the light tunnel 34 to uniformize the brightness distribution efficiently. However, in the present embodiment, the light tunnel 34 receives the laser beams diffused by the transmission diffusion plate 33, thereby uniformizing the brightness distribution efficiently. As a result, the pattern irradiation device 20 can reduce the size of the entire device by shortening the length of the light tunnel 34 in the optical axis direction.

The image forming unit 35 is arranged immediately after the light tunnel 34 without a relay optical system or the like interposed therebetween. Accordingly, the pattern irradiation device 20 can reduce the optical distance between the light tunnel 34 and the image forming unit 35, and prevent the diffused light output from the light tunnel 34 from leaking outside. Consequently, the pattern irradiation device 20 can increase the light transmission efficiency as well as the output energy.

In the present embodiment, the laser diodes 41 emit blue laser beams. Accordingly, the pattern irradiation device 20 can measure the distance more accurately. It can also provide a good working environment for the operators. The reasons are as follows.

For example, a light source P1W for projectors from OSRAM is known (http://www.osram.jp/osram_jp/press/press-releases/_trade_press/2013/osram-led-power-packs-for-projectors/). This power source P1W emits light with brightness of 500 lm for blue, 1250 lm for red, and 4150 lm for green. Lumen (lm) is a unit of luminous flux, which is brightness taking visibility into account. Radiant flux (unit W) of light, which does not take visibility into account, is calculated by luminous flux (lm)=683×radiant flux (W)×Y stimulus value. If the conversion factor lm/W is calculated from a typical spectrum of the respective colors, 40 lm/W is for blue, 200 lm/W is for red, and 480 lm/W is for green. Accordingly, from the luminous flux and the conversion factor, the radiant flux is 12.5 W for blue, 6.3 W for red, and 8.6 W for green. In other words, blue has the highest radiant flux.

In the pattern irradiation device 20 that emits an image pattern to measure the distance, it is preferable to provide a light source with a high radiant flux, which is pure output of light, rather than a luminous flux volume in which the sensitivity of human eyes, in other words, visibility is taken into account. Among the light sources that are available as described above, blue laser diodes provide high radiant flux. Because the laser diodes 41 output blue laser beams, the pattern irradiation device 20 can illuminate the object 11 with high energy and enables the accurate distance measurement even if the color of the object 11 is black and the like.

Moreover, blue has low luminous flux and does not dazzle human eyes. Accordingly, because the laser diodes 41 output blue laser beams, the pattern irradiation device 20 enables the operators to see the object 11 easily, and provides a good working environment. Blue is also visible light. Because the laser diodes 41 output blue laser beams, the pattern irradiation device 20 enables the operators to see the illumination area, thereby providing an environment where the operators can easily adjust the illumination area.

As described above, the pattern irradiation device 20 according to the present embodiment can obtain high optical output as well as reducing the size and cost thereof. The pattern irradiation device 20 can also provide a good working environment for the operators.

Second Embodiment

A pattern irradiation device 50 according to a second embodiment will now be described. The pattern irradiation device 50 according to the second embodiment is applied to the handling system 10 instead of the pattern irradiation device 20 according to the first embodiment. The same applies to the third embodiment and thereafter.

The pattern irradiation device 50 according to the second embodiment has substantially the same function and structure as those of the pattern irradiation device 20 according to the first embodiment. The members that have substantially the same function and structure are given the same reference numerals and the detailed descriptions thereof are omitted except for differences.

Figure 5:
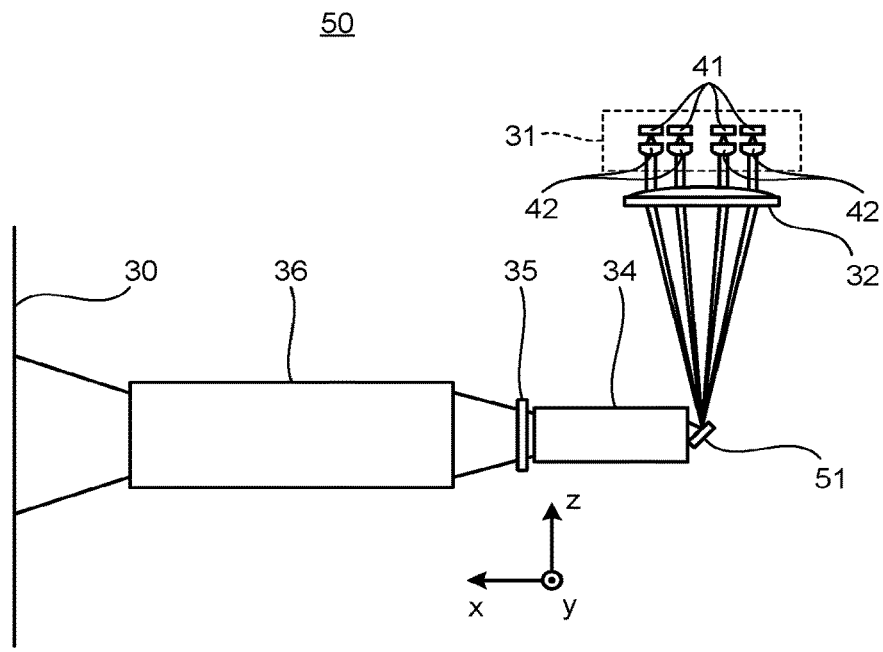
FIG. 5 is a schematic diagram illustrating the configuration of a pattern irradiation device according to a second embodiment of the present invention.

FIG. 5 is a schematic diagram illustrating the configuration of the pattern irradiation device 50 according to the second embodiment of the present invention. The pattern irradiation device 50 includes the light emitting unit 31, the light condensing unit 32, a reflection diffusion plate 51, the light tunnel 34, the image forming unit 35, and the irradiation optical system 36. The pattern irradiation device 50 is different from the first embodiment in that the reflection diffusion plate 51 is included instead of the transmission diffusion plate 33 as a diffusion unit.

The light condensing unit 32 condenses the light output from the light emitting unit 31 on the reflection diffusion plate 51. In the present embodiment, the light condensing unit 32 condenses a plurality of laser beams to substantially one point on the reflection diffusion plate 51.

The reflection diffusion plate 51 is a diffusion unit that diffuses the incident light. The reflection diffusion plate 51 receives the laser beams condensed by the light condensing unit 32, reflects and diffuses the incident light, and outputs the light to the light tunnel 34. The reflection diffusion plate 51 is different from the transmission diffusion plate 33 in that it reflects and diffuses light. However, the other functions and effects are the same as those of the transmission diffusion plate 33.

The light tunnel 34 receives the light diffused by the reflection diffusion plate 51, uniformizes the brightness distribution thereof compared with that of the incident light, and outputs the resulting light.

Figure 6:
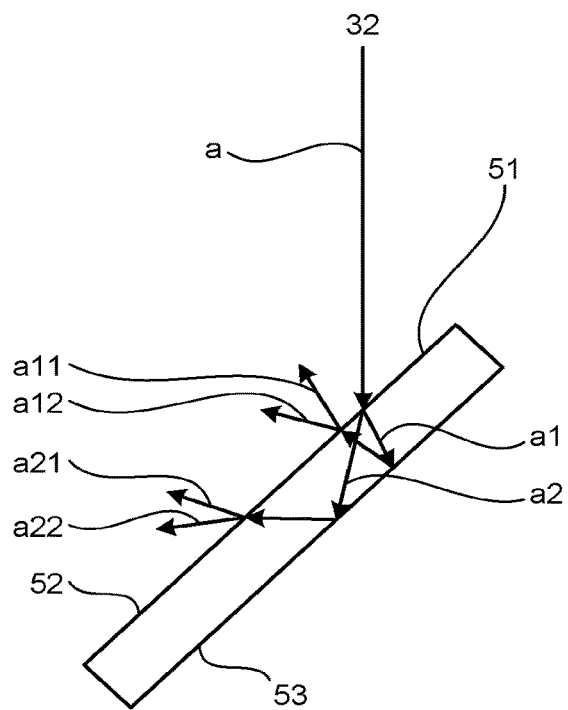
FIG. 6 is a schematic diagram illustrating an example of an optical path at a reflection diffusion plate.

FIG. 6 is a schematic diagram illustrating an example of an optical path at the reflection diffusion plate 51. The reflection diffusion plate 51 is generally flat and includes a transmission diffusion surface 52 formed on the side facing the light condensing unit 32 and a reflection surface 53 formed on the side opposite to the side facing the light condensing unit 32.

Fine concaves and convexes are randomly formed on the transmission diffusion surface 52. The transmission diffusion surface 52 transmits light and diffuses the transmitted light. An antireflection film may be formed on the surface of the transmission diffusion surface 52. Accordingly, the transmission diffusion surface 52 can increase the transmittance.

The reflection surface 53 reflects the light received from the light condensing unit 32 and transmitted through the transmission diffusion surface 52. As an example, the reflection surface 53 is flat and does not diffuse light. A reflection coating film such as a derivative multilayer film or a metal film may be applied on the surface of the reflection surface 53. Accordingly, the reflection surface 53 can increase the reflectivity. The light reflected by the reflection surface 53 passes through the transmission diffusion surface 52 again and enters the light tunnel 34.

As illustrated in FIG. 6, it is assumed that the reflection diffusion plate 51 receives a luminous flux a from the light condensing unit 32. In this case, the luminous flux a enters the front surface of the transmission diffusion surface 52. The luminous flux a is then transmitted and diffused by the transmission diffusion surface 52, and becomes diffuse luminous fluxes a1 and a2. Here, only the diffuse luminous fluxes a1 and a2 are illustrated. However, there are many diffuse luminous fluxes of the luminous flux a.

Subsequently, the diffuse luminous fluxes a1 and a2 are reflected at the reflection surface 53 and enter the transmission diffusion surface 52 again from the reverse surface side. The diffuse luminous fluxes a1 and a2 are transmitted and diffused by the transmission diffusion surface 52, and become diffuse luminous fluxes a11, a12, a21, and a22. Here, only the diffuse luminous fluxes a11, a12, a21, and a22 are illustrated but there are many diffuse luminous fluxes of the luminous fluxes a1 and a2.

In this manner, the reflection diffusion plate 51 configured in this manner can diffuse the light twice at the transmission diffusion surface 52. Accordingly, the reflection diffusion plate 51 can enhance the diffusion effect and output the light with more uniform brightness distribution. Consequently, the pattern irradiation device 50 according to the present embodiment can irradiate the object 11 with an image pattern having more uniform brightness distribution.

In the present embodiment, the surface of the reflection diffusion plate 51 facing the light condensing unit 32 is the transmission diffusion surface 52. However, the surface of the reflection diffusion plate 51 facing the light condensing unit 32 may be a reflection diffusion surface for diffusion and reflection.

In this manner, because the pattern irradiation device 50 according to the present embodiment includes the reflection diffusion plate 51, it can output more uniform light.

Figure 7:
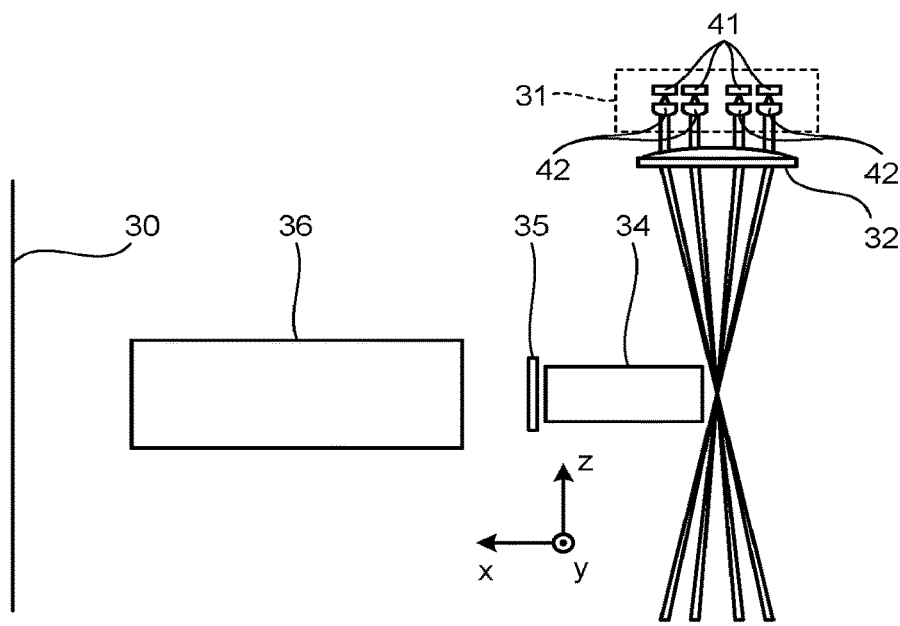
FIG. 7 is a schematic diagram illustrating an example of an optical path when a reflection diffusion plate is disengaged.

FIG. 7 is a schematic diagram illustrating an example of an optical path when the reflection diffusion plate 51 is disengaged. In the pattern irradiation device 50 according to the present embodiment, it is assumed that the laser beams are not reflected by the reflection diffusion plate 51, because the reflection diffusion plate 51 is disengaged, broken, or the like due to malfunction, for example. In this case, as illustrated in FIG. 7, the laser beams output from the light emitting unit 31 do not enter the light tunnel 34. Accordingly, in this case, the pattern irradiation device 50 does not emit light on the projection plane 30.

Consequently, in the pattern irradiation device 50, when the reflection diffusion plate 51 is disengaged, broken, or the like, the laser beams are not diffused nor output directly to the outside. Thus, the pattern irradiation device 50 can achieve an output prevention mechanism of laser beams in a simple configuration, in case of the diffusion unit being disengaged or broken.

Third Embodiment

A pattern irradiation device 60 according to a third embodiment will now be described. The pattern irradiation device 60 according to the third embodiment has substantially the same function and structure as those of the pattern irradiation device 50 according to the second embodiment. The members that have substantially the same function and structure are given the same reference numerals and the detailed descriptions thereof are omitted except for differences.

Figure 8:
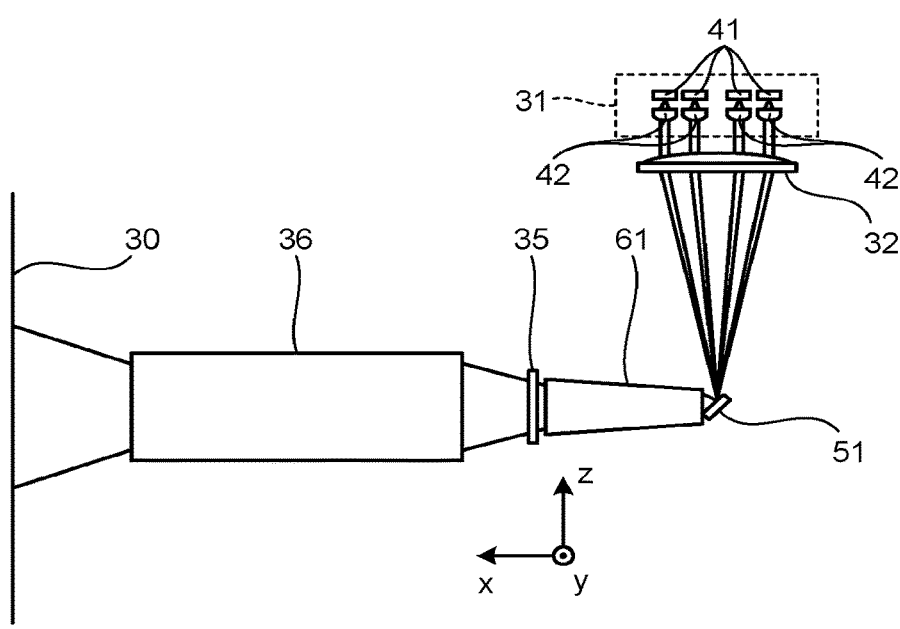
FIG. 8 is a schematic diagram illustrating the configuration of a pattern irradiation device according to a third embodiment of the present invention.

FIG. 8 is a schematic diagram illustrating the configuration of the pattern irradiation device 60 according to the third embodiment of the present invention. The pattern irradiation device 60 includes the light emitting unit 31, the light condensing unit 32, the reflection diffusion plate 51, a tapered light tunnel 61, the image forming unit 35, and the irradiation optical system 36. The pattern irradiation device 60 is different from the second embodiment in that the tapered light tunnel 61 is included instead of the light tunnel 34 as a uniformizing optical system.

The tapered light tunnel 61 receives the light diffused by the reflection diffusion plate 51, uniformizes the brightness distribution thereof compared with that of the incident light, and outputs the resulting light. Although the shape is different, the tapered light tunnel 61 has substantially the same function and structure as those of the light tunnel 34.

Figure 9:
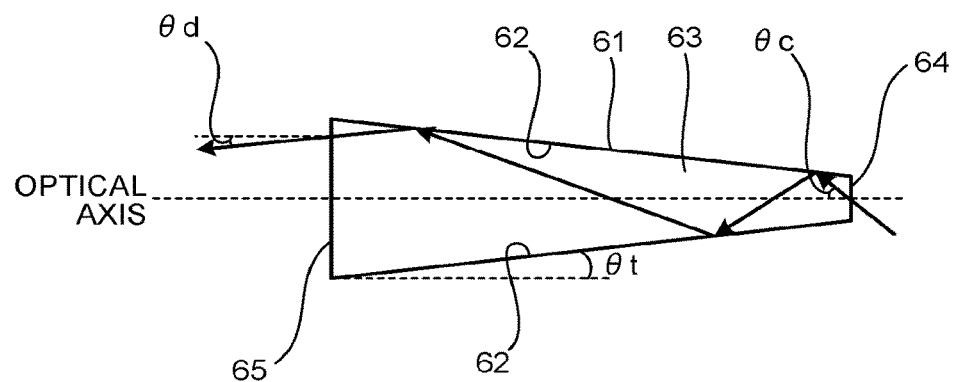
FIG. 9 is a schematic diagram illustrating an example of an optical path in a tapered light tunnel.

FIG. 9 is a schematic diagram illustrating an example of an optical path in the tapered light tunnel 61. As illustrated in FIG. 9, the tapered light tunnel 61 is different from the light tunnel 34 in that it has an output port 65 larger than an input port 64, and a reflecting side surface 62 tilted relative to the optical axis of an optical path 63. In the tapered light tunnel 61, the shape of the plane (including the shape of the input port 64 and the output port 65) perpendicular to the optical axis of the optical path 63 is in a rectangular shape having substantially the same aspect ratio as that of the image forming unit 35.

In the tapered light tunnel 61 configured in this manner, similar to the light tunnel 34, the incident light passes through the inside of the optical path 63 by reflecting off the reflecting side surface 62. Consequently, it is possible to uniformize the brightness distribution of the output light compared with that of the incident light.

Here, the reflecting side surface 62 vertical to the z direction in the tapered light tunnel 61 is tilted in the Z direction at an angle $\theta t$ relative to the optical axis. As a result, the tapered light tunnel 61 can reduce the angle $\theta d$ of the output light than the angle $\theta c$ of the incident light. Accordingly, the tapered light tunnel 61 can reduce the angle (diffusion angle) of light to the image forming unit 35 in the subsequent stage.

Consequently, by including the tapered light tunnel 61, the pattern irradiation device 60 can reduce the incidence angle or numerical aperture (NA) of the rays of light to the irradiation optical system 36 after passing through the image forming unit 35. As a result, the pattern irradiation device 60 can improve the light capturing efficiency of the irradiation optical system 36, thereby obtaining high optical output.

The tapered light tunnel 61 can reduce the angle $\theta d$ of the output light by increasing the tilted angle $\theta t$ of the reflecting side surface 62. The tilted angle $\theta t$ can be increased, by reducing the size of the input port 64 or by increasing the size of the output port 65. However, if the size of the input port 64 is reduced, it is difficult to efficiently capture the light reflected by the reflection diffusion plate 51. If the output port 65 is increased, the light that illuminates the outside of the image forming unit 35 will be wasted. Accordingly, it is preferable to appropriately set the tilted angle $\theta t$, the size of the input port 64, and the size of the output port 65 by taking these into consideration.

When the length of the tapered light tunnel 61 is increased in the optical axis direction while the sizes of the input port 64 and the output port 65 are fixed, it is possible to increase the number of times of reflection and further uniformize the brightness distribution. However, if the length of the tapered light tunnel 61 is increased in the optical axis direction, the efficiency reduces due to the increased reflection times. In addition, the capturing efficiency of the irradiation optical system 36 reduces because the tilted angle $\theta t$ becomes small. Consequently, it is preferable to appropriately set the length of the tapered light tunnel 61 in the optical axis direction by taking these into consideration.

As described above, because the pattern irradiation device 60 according to the present embodiment includes the tapered light tunnel 61, it can achieve high output.

Fourth Embodiment

A pattern irradiation device 70 according to a fourth embodiment will now be described. The pattern irradiation device 70 according to the fourth embodiment has substantially the same function and structure as those of the pattern irradiation device 60 according to the third embodiment. The members that have substantially the same function and structure are given the same reference numerals and the detailed descriptions thereof are omitted except for differences.

Figure 10:
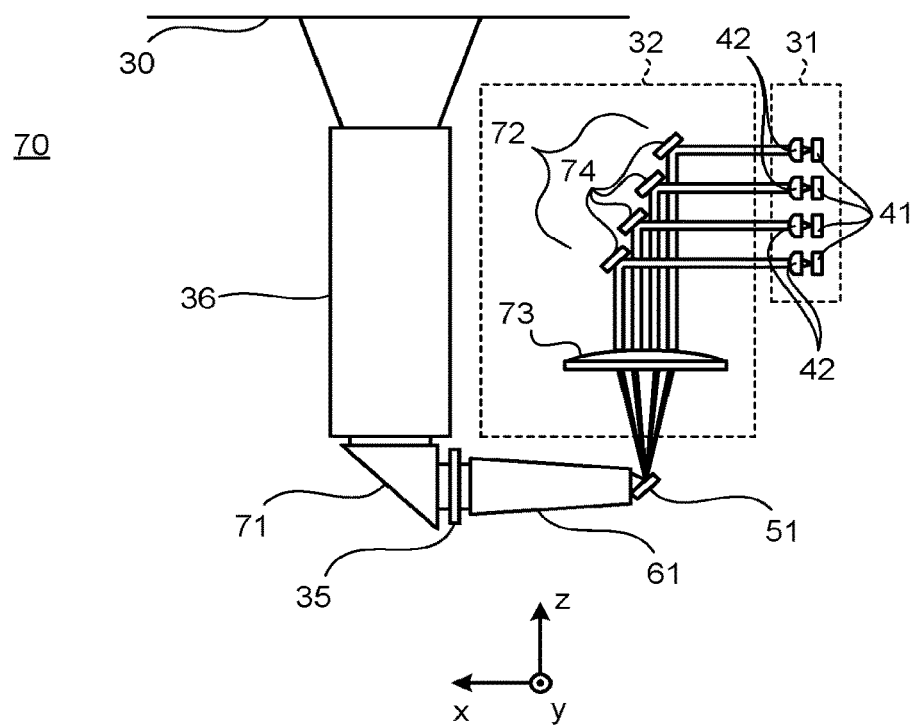
FIG. 10 is a schematic diagram illustrating the configuration of a pattern irradiation device according to a fourth embodiment of the present invention.

FIG. 10 is a schematic diagram illustrating the configuration of the pattern irradiation device 70 according to the fourth embodiment. The pattern irradiation device 70 includes the light emitting unit 31, the light condensing unit 32, the reflection diffusion plate 51, the tapered light tunnel 61, the image forming unit 35, a prism 71, and the irradiation optical system 36. The light condensing unit 32 includes a first mirror group 72 and a lens 73.

The pattern irradiation device 70 is different from the third embodiment in that it includes the prism 71. The pattern irradiation device 70 is also different from the third embodiment in that the light condensing unit 32 includes the first mirror group 72 and the lens 73.

The first mirror group 72 reflects parallel luminous fluxes output from the light emitting unit 31 in the same direction and guides them to the lens 73. The first mirror group 72 includes a plurality of mirrors 74. The mirrors 74 reflect the laser beams output from the laser diodes 41 and made into parallel luminous fluxes by the collimator lenses 42, in the direction toward the lens 73. The mirrors 74 reflect the parallel luminous fluxes in the same direction, in other words, reflect the parallel luminous fluxes in parallel.

The lens 73 condenses the luminous fluxes input in parallel to substantially one point on the reflection diffusion plate 51.

The prism 71 is interposed between the image forming unit 35 and the irradiation optical system 36. In the present embodiment, the irradiation optical system 36 is arranged so that the optical axis of the incident light is perpendicular to the optical axis of the tapered light tunnel 61. The prism 71 reflects the light output from the image forming unit 35 and causes the light to enter the irradiation optical system 36. By including the prism 71 configured in this manner, the pattern irradiation device 70 can arrange the respective components within a small space. The pattern irradiation device 70 may include a mirror instead of the prism 71.

When the prism 71 is interposed between the tapered light tunnel 61 and the image forming unit 35, the distance between the tapered light tunnel 61 and the image forming unit 35 is increased, thereby increasing the light loss. Even if a lens or the like is used for condensing light, the number of parts is increased. However, because the pattern irradiation device 70 according to the fourth embodiment includes the prism 71 between the image forming unit 35 and the irradiation optical system 36, a compact arrangement can be obtained without reducing the efficiency.

Figure 11:
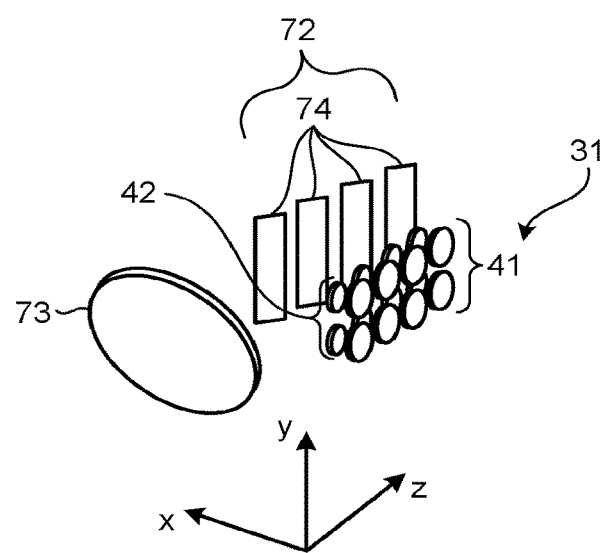
FIG. 11 is a schematic diagram illustrating an example of an arrangement of a first mirror group, a lens, and the like according to the fourth embodiment.

FIG. 11 is a schematic diagram illustrating an example of an arrangement of the first mirror group 72, the lens 73, and the like according to the fourth embodiment. In the present embodiment, the light emitting unit 31 includes eight laser diodes 41 and eight collimator lenses 42 arranged in a matrix of two rows and four columns.

In the present embodiment, the first mirror group 72 includes four mirrors 74. Each of the four mirrors 74 is arranged corresponding to two laser diodes 41 and two collimator lenses 42 disposed in the y direction. Each of the mirrors 74 reflects two parallel luminous fluxes output from the corresponding two collimator lenses 42.

The first mirror group 72 may include eight mirrors 74. In this case, each of the mirrors 74 reflects parallel luminous flux output from one of the collimator lenses 42.

Figure 12A:
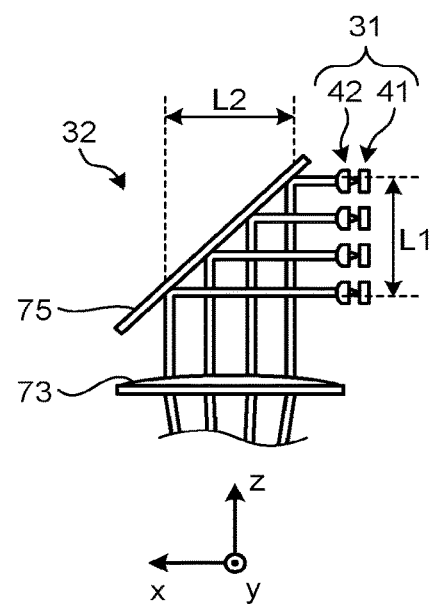
FIG. 12A is a schematic diagram of an optical path when a single-plate mirror is used.
Figure 12B:
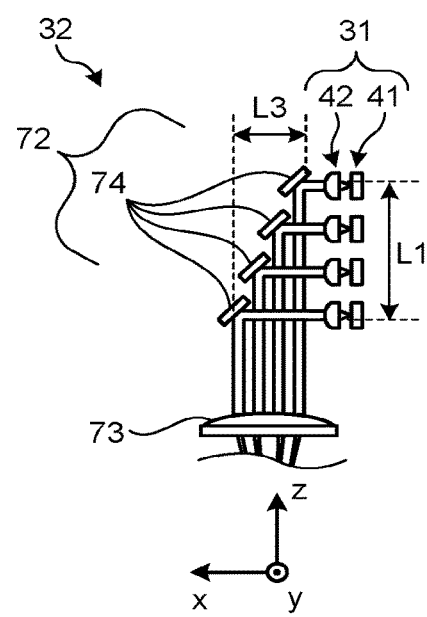
FIG. 12B is a schematic diagram of an optical path when the first mirror group is used.

FIG. 12A is a schematic diagram of an optical path when a single-plate mirror 75 is used, and FIG. 12B is a schematic diagram of an optical path when the first mirror group 72 is used.

It is assumed that the pattern irradiation device 70 includes the single-plate mirror 75 as illustrated in FIG. 12A instead of the first mirror group 72. The single-plate mirror 75 is arranged inclined at 45 degrees relative to the parallel luminous fluxes output from the light emitting unit 31. Accordingly, the single-plate mirror 75 can bend the parallel luminous fluxes output from the light emitting unit 31 by 90 degrees.

Here, it is assumed that the luminous flux width formed by the parallel luminous fluxes output from the light emitting unit 31 is L1. It is also assumed that the luminous flux width formed by the parallel luminous fluxes that enter the lens 73 from the single-plate mirror 75 is L2. The lengths of L1 and L2 are the same.

As illustrated in FIG. 12B, each of the mirrors 74 that configure the first mirror group 72 is also arranged inclined at 45 degrees relative to the parallel luminous fluxes output from the light emitting unit 31. Accordingly, each of the mirrors 74 can bend the parallel luminous flux output from the light emitting unit 31 by 90 degrees.

The mirrors 74 reflect a plurality of beams of light output from the light emitting unit 31 so as to narrow the luminous flux width formed by the parallel luminous fluxes output from the light emitting unit 31 in the same direction, and guide them to the lens 73. As a result, if the luminous flux width formed by the parallel luminous fluxes that enter the lens 73 from the mirrors 74 is L3, L3 is shorter than L1.

In this manner, the first mirror group 72 reduces the luminous flux width of light that enters the lens 73. Consequently, the pattern irradiation device 70 can reduce the size of the lens 73. Moreover, because the luminous flux width of the light that enters the lens 73 is small, the pattern irradiation device 70 can reduce the incidence angle of light condensed on the reflection diffusion plate 51. Accordingly, the pattern irradiation device 70 can reduce the diffusion angle of the luminous fluxes output from the tapered light tunnel 61. As a result, the pattern irradiation device 70 can reduce the NA of the irradiation optical system 36, thereby improving the light capturing efficiency of the irradiation optical system 36.

As described above, because the pattern irradiation device 70 according to the present embodiment bends the optical axis by the prism 71 and the first mirror group 72, a compact arrangement can be obtained. It can also achieve high output by reducing the luminous flux width.

Fifth Embodiment

A pattern irradiation device 80 according to a fifth embodiment will now be described. The pattern irradiation device 80 according to the fifth embodiment has substantially the same function and structure as those of the pattern irradiation device 70 according to the fourth embodiment. The members that have substantially the same function and structure are given the same reference numerals and the detailed descriptions thereof are omitted except for differences.

Figure 13:
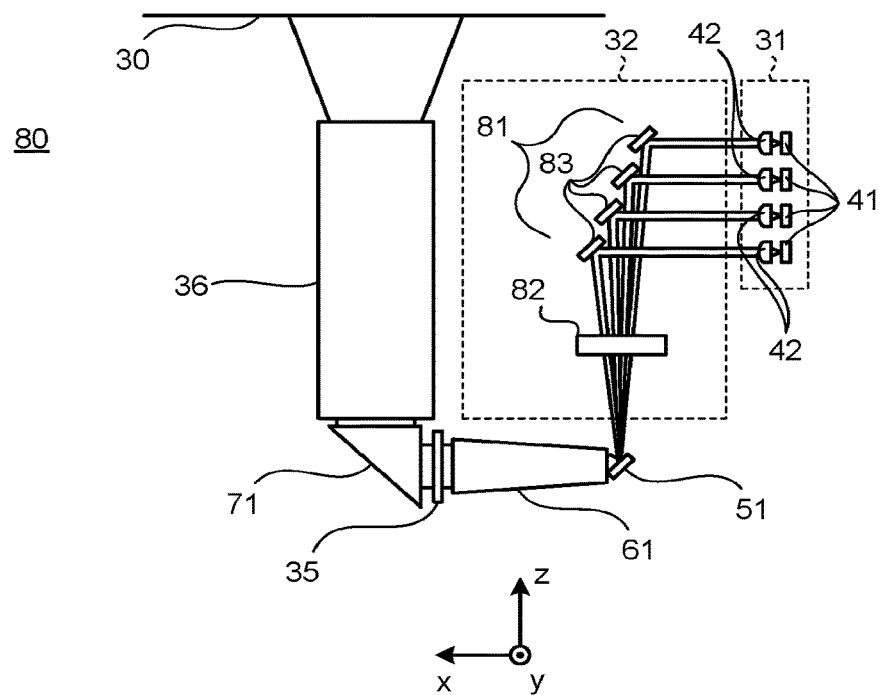
FIG. 13 is a schematic diagram illustrating the configuration of a pattern irradiation device according to a fifth embodiment of the present invention.

FIG. 13 is a schematic diagram illustrating the configuration of the pattern irradiation device 80 according to the fifth embodiment of the present invention. The light condensing unit 32 according to the fifth embodiment includes a second mirror group 81 and a cylindrical lens 82. The pattern irradiation device 80 is different from the fourth embodiment in that the light condensing unit 32 includes the second mirror group 81 and the cylindrical lens 82.

The second mirror group 81 reflects the parallel luminous fluxes output from the light emitting unit 31 in the same direction and guides them to the reflection diffusion plate 51. The second mirror group 81 includes a plurality of mirrors 83. Each of the mirrors 83 reflects the laser beams output from the laser diodes 41 and made into parallel luminous fluxes by the collimator lenses 42 in the direction toward the reflection diffusion plate 51.

In this case, the mirrors 83 condense the parallel luminous fluxes in the first direction, perpendicular to the optical axis by, reflection angles. In the present embodiment, the reflection angles of the mirrors 83 are set so that the components of the parallel luminous fluxes in the x direction are emitted to substantially one point on the reflection diffusion plate 51.

Accordingly, the reflection angles of the mirrors 83 that configure the second mirror group 81 in the first direction are different from one another.

The cylindrical lens 82 is provided between the second mirror group 81 and the reflection diffusion plate 51. The cylindrical lens 82 condenses the parallel luminous fluxes traveling from the second mirror group 81 to the reflection diffusion plate 51 in the direction perpendicular to the optical axis as well as the second direction perpendicular to the first direction.

Figure 14:
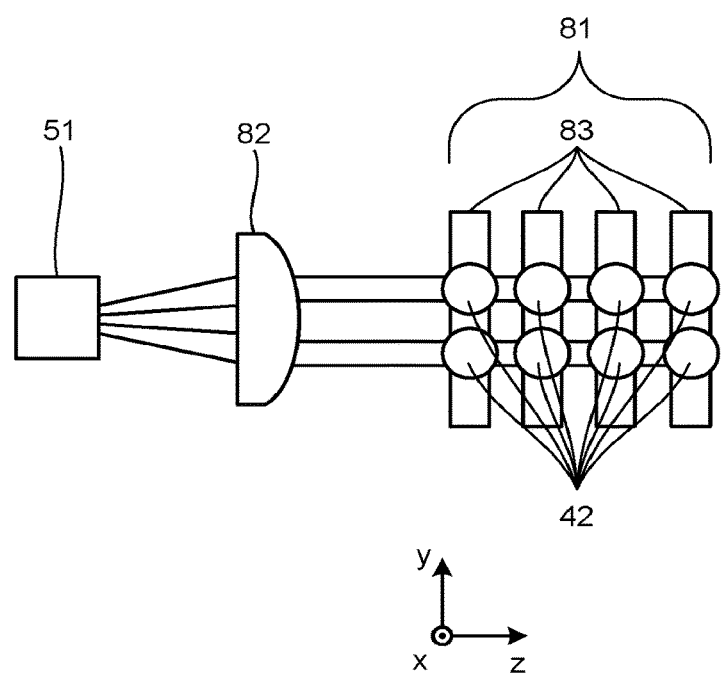
FIG. 14 is a schematic diagram illustrating an example of an arrangement of a second mirror group, a cylindrical lens, and the like according to the fifth embodiment.

FIG. 14 is a schematic diagram illustrating an example of an arrangement of the second mirror group 81, the cylindrical lens 82, and the like, according to the fifth embodiment. In the present embodiment, the light emitting unit 31 includes eight laser diodes 41 and eight collimator lenses 42 arranged in a matrix of two rows and four columns.

In the present embodiment, the second mirror group 81 includes four mirrors 83. Each of the four mirrors 83 is arranged corresponding to two laser diodes 41 and two collimator lenses 42 disposed in the y direction. Each of the mirrors 83 reflects two parallel luminous fluxes output from the corresponding two collimator lenses 42.

The second mirror group 81 may include eight mirrors 83. In this case, each of the mirrors 83 reflects the parallel luminous flux output from one of the collimator lenses 42.

The cylindrical lens 82 condenses the parallel luminous fluxes traveling from the second mirror group 81 to the reflection diffusion plate 51 in the direction perpendicular to the optical axis as well as the second direction perpendicular to the first direction. In the present embodiment, the cylindrical lens 82 condenses light so that the components of the parallel luminous fluxes in the y direction are emitted to substantially one point on the reflection diffusion plate 51.

In this manner, because the pattern irradiation device 80 condenses the light by the reflection angles of the mirrors 83, a lens is not used for the condensing operation in the first direction (such as the x direction). Accordingly, in the pattern irradiation device 80, the luminous flux width of light that enters the cylindrical lens 82 is comparatively narrow. Consequently, it is possible to reduce the lens diameter of the cylindrical lens 82. Moreover, because the pattern irradiation device 80 can reduce the lens diameter of the cylindrical lens 82, it is possible to reduce the curvature radius of the cylindrical lens 82 while securing the edge thickness that can be manufactured. As a result, because the pattern irradiation device 80 can shorten the distance between the cylindrical lens 82 and the reflection diffusion plate 51, it is possible to reduce the size of the entire device.

The pattern irradiation device 80 may include a toroidal lens whose curvature radius is different between the first direction (such as the x direction) and the second direction (such as the y direction) instead of the cylindrical lens 82. In this case, the reflection angles of the second mirror group 81 are set so that the components of the parallel luminous fluxes in the first direction are emitted to substantially one point on the reflection diffusion plate 51, in conjunction with the condensing operation of the toroidal lens in the first direction.

Sixth Embodiment

A pattern irradiation device 90 according to a sixth embodiment will now be described. The pattern irradiation device 90 according to the sixth embodiment has substantially the same function and structure as those of the pattern irradiation device 70 according to the fourth embodiment. The members that have substantially the same function and structure are given the same reference numerals and the detailed descriptions thereof are omitted except for differences.

Figure 15:
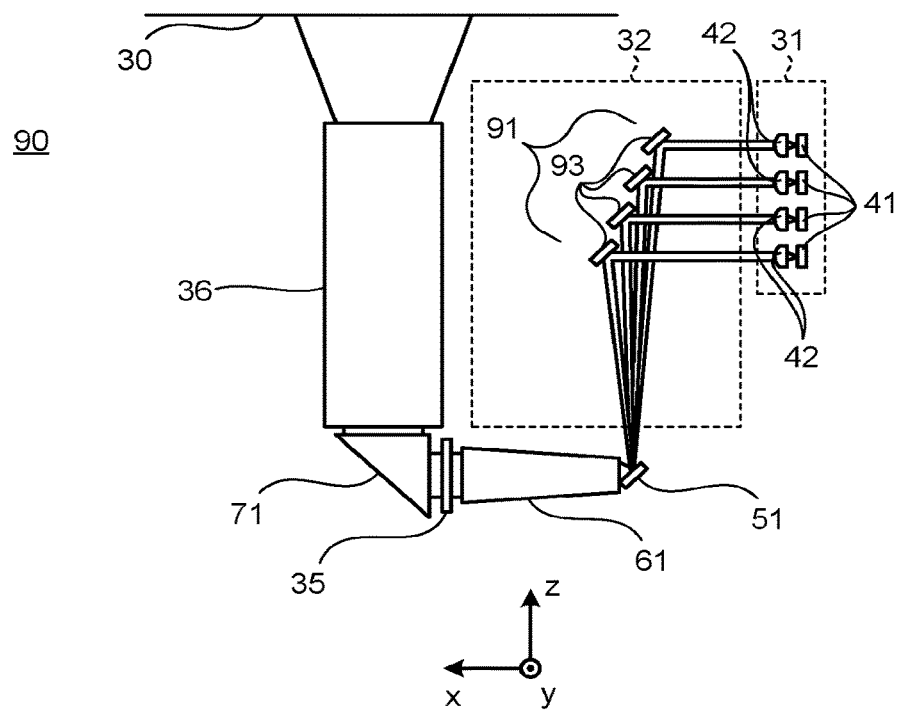
FIG. 15 is a schematic diagram illustrating the configuration of a pattern irradiation device according to a sixth embodiment of the present invention.

FIG. 15 is a schematic diagram illustrating the configuration of the pattern irradiation device 90 according to the sixth embodiment. The light condensing unit 32 according to the sixth embodiment includes a third mirror group 91. The pattern irradiation device 90 is different from the fourth embodiment in that the light condensing unit 32 includes the third mirror group 91.

The third mirror group 91 reflects the parallel luminous fluxes output from the light emitting unit 31 in the same direction and guides them to the reflection diffusion plate 51. The third mirror group 91 includes a plurality of mirrors 93. Each of the mirrors 93 reflects the laser beams output from the laser diodes 41 and made into parallel luminous fluxes by the collimator lenses 42, in the direction toward the reflection diffusion plate 51.

In this case, the mirrors 93 condense the parallel luminous fluxes by the reflection angles. In the present embodiment, the reflection angles of the mirrors 93 are set so that the parallel luminous fluxes are emitted to substantially one point on the reflection diffusion plate 51. Accordingly, the reflection angles of the mirrors 93 that configure the third mirror group 91 are different from one another.

Figure 16:
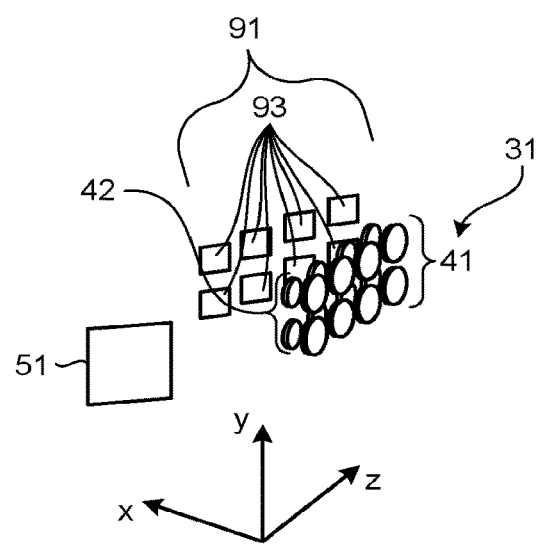
FIG. 16 is a schematic diagram illustrating an example of an arrangement of a third mirror group and the like according to the sixth embodiment.

FIG. 16 is a schematic diagram illustrating an example of an arrangement of the third mirror group 91 and the like according to the sixth embodiment. In the present embodiment, the light emitting unit 31 includes eight laser diodes 41 and eight collimator lenses 42 arranged in a matrix of two rows and four columns.

In the present embodiment, the third mirror group 91 includes the eight mirrors 93. Each of the eight mirrors 93 is arranged corresponding to one of the laser diodes 41 and one of the collimator lenses 42. Each of the mirrors 93 reflects one of the parallel luminous fluxes output from the corresponding collimator lens 42. The reflection angles of the mirrors 93 are arranged so that the reflected parallel luminous fluxes are emitted to substantially one point on the reflection diffusion plate 51.

In this manner, the pattern irradiation device 90 condenses the luminous fluxes on the reflection diffusion plate 51 by the third mirror group 91. Because the pattern irradiation device 90 does not need to include a lens for condensing the luminous fluxes on the reflection diffusion plate 51, it is possible to simplify the configuration. When a lens is used to condense light, the distance between the lens and the reflection diffusion plate 51 is limited by the lower limit of the focal length. However, in the pattern irradiation device 90, only the inclination of the mirrors 93 that configure the third mirror group 91 needs to be adjusted, and there is no distance limit as described above. As a result, a compact arrangement can be obtained.

Seventh Embodiment

A pattern irradiation device 110 according to a seventh embodiment will now be described. The pattern irradiation device 110 according to the seventh embodiment has substantially the same function and structure as those of the pattern irradiation device 20 according to the first embodiment. The members that have substantially the same function and structure are given the same reference numerals and the detailed descriptions thereof are omitted except for differences.

Figure 17:
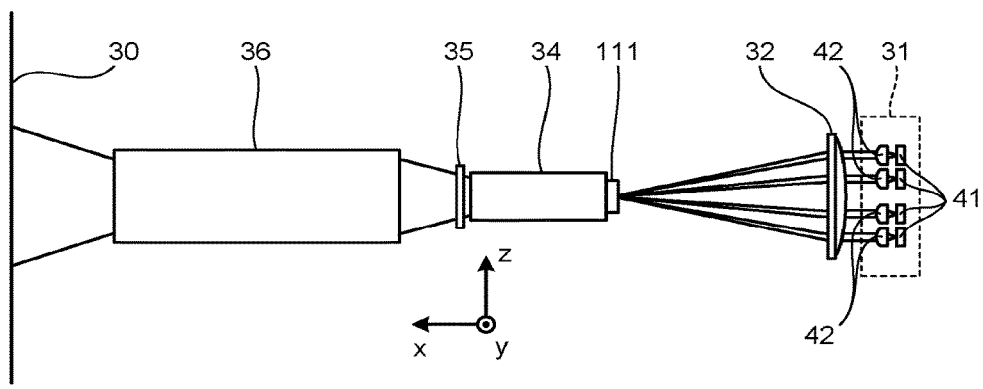
FIG. 17 is a schematic diagram illustrating the configuration of a pattern irradiation device according to a seventh embodiment of the present invention.

FIG. 17 is a schematic diagram illustrating the configuration of the pattern irradiation device 110 according to the seventh embodiment. The pattern irradiation device 110 includes the light emitting unit 31, the light condensing unit 32, a transmission fluorescent unit 111, the light tunnel 34, the image forming unit 35, and the irradiation optical system 36. The pattern irradiation device 110 is different from the first embodiment in that the transmission fluorescent unit 111 is included instead of the transmission diffusion plate 33.

The light condensing unit 32 condenses the light output from the light emitting unit 31 on the transmission fluorescent unit 111. In the present embodiment, the light condensing unit 32 condenses a plurality of laser beams to substantially one point on the transmission fluorescent unit 111.

The transmission fluorescent unit 111 is a transmission-type fluorescent unit that emits fluorescence using the incident light as excitation light. The transmission fluorescent unit 111 receives a plurality of laser beams condensed by the light condensing unit 32, and emits fluorescence using the incident light as excitation light. The transmission fluorescent unit 111 outputs the generated fluorescence to the light tunnel 34 arranged opposite to the light condensing unit 32.

The light tunnel 34 receives the fluorescence emitted by the transmission fluorescent unit 111, uniformizes the brightness distribution thereof compared with that of the incident light, and outputs the resulting light. The light tunnel 34 can output the light having the same angle as the output angle of the fluorescence emitted by the transmission fluorescent unit 111.

The transmission fluorescent unit 111, for example, includes a transparent substrate such as a glass plate and a fluorescent material provided on the substrate. Accordingly, the transmission fluorescent unit 111 can emit fluorescence from the plane opposite to the input plane of the excitation light.

The transmission fluorescent unit 111 may, for example, be a fluorescent ceramic. The fluorescent ceramic is a sintered body formed by molding a fluorescent material into an optional form (such as a thin sheet) and heating it. However, the transmission fluorescent unit 111 is not limited to this and may be of any form as long as it emits fluorescence using the light emitted by the light emitting unit 31 as excitation light, and outputs fluorescence from the plane opposite to the input plane of the excitation light.

In the present embodiment, the light emitting unit 31 generates blue laser beams. The transmission fluorescent unit 111 emits yellow light by using the blue laser beams as excitation light. The diodes that emit blue laser beams have a comparatively high output and are also inexpensive. Accordingly, because the light emitting unit 31 generates blue laser beams, the pattern irradiation device 110 can irradiate the object 11 with high output light with an inexpensive configuration. As a result, even if the surface of the object 11 is black and the like, the pattern irradiation device 110 can perform accurate distance measurement with an inexpensive configuration.

The light emitted from the light emitting unit 31 is not limited to blue but may be light with other wavelengths (such as ultraviolet rays and light other than visible light). The transmission fluorescent unit 111 may emit not only yellow fluorescence but also fluorescence of light with other wavelengths (such as red, green, blue, and white).

The transmission fluorescent unit 111 emits incoherent fluorescence using coherent light as excitation light. Accordingly, the transmission fluorescent unit 111 can emit uniform light without speckle noise. As a result, the pattern irradiation device 110 according to the present embodiment can irradiate the object 11 with an image pattern from which the speckle noise is removed.

The transmission fluorescent unit 111 is arranged immediately before the light tunnel 34 without a relay optical system and the like interposed therebetween. Consequently, the optical distance between the transmission fluorescent unit 111 and the light tunnel 34 is short. In addition, the light emitted from the fluorescent material is a Lambert distribution, in general. Accordingly, the pattern irradiation device 110 can prevent the fluorescence from leaking outside the light tunnel 34. As a result, the pattern irradiation device 110 can enhance the light transmission efficiency and increase the output energy.

The light condensing unit 32 condenses the laser beams output from the light emitting unit 31 on the transmission fluorescent unit 111. Accordingly, even if the number of laser diodes 41 included in the light emitting unit 31 is increased, it is possible to condense light on the transmission fluorescent unit 111, which is a relatively small area. As a result, the pattern irradiation device 110 can increase the output energy while reducing the size of the fluorescent material as well as cutting the cost.

As described above, the pattern irradiation device 110 according to the present embodiment can remove speckle noise from the image pattern as well as reducing the size and cost thereof.

The pattern irradiation device 110 according to the present embodiment may include the tapered light tunnel 61 illustrated in FIG. 9 instead of the light tunnel 34. Consequently, the pattern irradiation device 110 according to the present embodiment can obtain the same effects as those of the third embodiment.

The pattern irradiation device 110 according to the present embodiment may also include the prism 71 illustrated in FIG. 10 or a mirror. The light condensing unit 32 in the pattern irradiation device 110 according to the present embodiment may have the configuration as illustrated in FIG. 11, 12A, or 12B. Consequently, the pattern irradiation device 110 according to the present embodiment can obtain the same effects as those of the fourth embodiment.

The light condensing unit 32 in the pattern irradiation device 110 according to the present embodiment may have the optical configuration as illustrated in FIGS. 13 and 14. Consequently, the pattern irradiation device 110 according to the present embodiment can obtain the same effects as those of the fifth embodiment.

The light condensing unit 32 in the pattern irradiation device 110 according to the present embodiment may have the optical configuration as illustrated in FIGS. 15 and 16. Consequently, the pattern irradiation device 110 according to the present embodiment can obtain the same effects as those of the sixth embodiment.

Eighth Embodiment

A pattern irradiation device 120 according to an eighth embodiment will now be described. The pattern irradiation device 120 according to the eighth embodiment has substantially the same function and structure as those of the pattern irradiation device 110 according to the seventh embodiment. The members that have substantially the same function and structure are given the same reference numerals and the detailed descriptions thereof are omitted except for differences.

Figure 18:
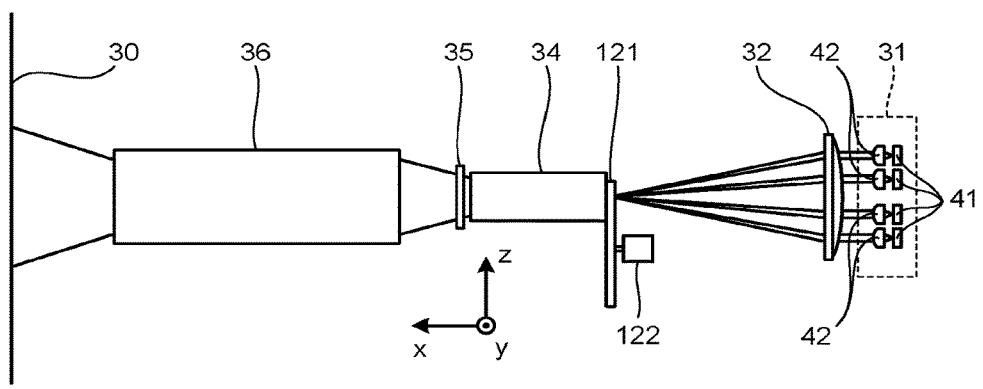
FIG. 18 is a schematic diagram illustrating the configuration of a pattern irradiation device according to an eighth embodiment of the present invention.

FIG. 18 is a schematic diagram illustrating the configuration of the pattern irradiation device 120 according to the eighth embodiment of the present invention. The pattern irradiation device 120 includes the light emitting unit 31, the light condensing unit 32, a movable transmission fluorescent unit 121, a first driving unit 122, the light tunnel 34, the image forming unit 35, and the irradiation optical system 36. The pattern irradiation device 120 is different from the seventh embodiment in that the movable transmission fluorescent unit 121 and the first driving unit 122 are included instead of the transmission fluorescent unit 111.

The movable transmission fluorescent unit 121 is a transmission-type fluorescent unit that can change the portion at which the light is emitted. The movable transmission fluorescent unit 121 receives the laser beams condensed by the light condensing unit 32 and emits fluorescence using the incident light as excitation light. The movable transmission fluorescent unit 121 outputs the generated fluorescence to the light tunnel 34 arranged opposite to the light condensing unit 32. The first driving unit 122 changes the portion at which the light is emitted on the movable transmission fluorescent unit 121.

Figure 19:
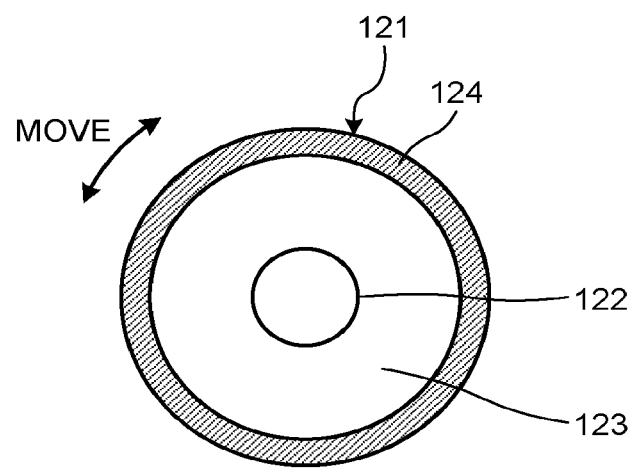
FIG. 19 is a schematic diagram illustrating an example of a movable fluorescent unit and a first driving unit.

FIG. 19 is a schematic diagram illustrating an example of the movable transmission fluorescent unit 121 and the first driving unit 122. The movable transmission fluorescent unit 121, as an example, includes a substrate 123 and a fluorescent material 124. The substrate 123 is a transparent thin plate in a disk shape and is rotatable around the center axis. The fluorescent material 124 is provided at the periphery of the substrate 123 in a ring shape. The fluorescent material 124 receives the laser beams condensed by the light condensing unit 32 at a part thereof, and emits fluorescence using the incident light as excitation light.

The first driving unit 122 rotates and drives the movable transmission fluorescent unit 121 around the center axis of the substrate 123. Consequently, the first driving unit 122 can change the portion at which the laser beams condensed by the light condensing unit 32 are emitted on the ring-shaped fluorescent material 124.

In this manner, the pattern irradiation device 120 according to the eighth embodiment can change the portion at which the light is emitted on the movable transmission fluorescent unit 121. As a result, the pattern irradiation device 120 according to the eighth embodiment can prevent deterioration, which can be caused by continuously and intensely emitting the laser beams on the same portion of the movable transmission fluorescent unit 121.

The configuration of the movable transmission fluorescent unit 121 is not limited to the one in which the ring-shaped fluorescent material 124 is rotatably arranged. For example, the movable transmission fluorescent unit 121 may include a long fluorescent material 124 provided so as to move back and forth along the longitudinal direction. The movable transmission fluorescent unit 121 may also include a polygonal fluorescent material 124 or an ellipse fluorescent material 124. The movable transmission fluorescent unit 121 may also include a fluorescent ceramic instead of the substrate 123 and the fluorescent material 124.

Ninth Embodiment

A pattern irradiation device 130 according to a ninth embodiment will now be described. The pattern irradiation device 130 according to the ninth embodiment has substantially the same function and structure as those of the pattern irradiation device 110 according to the seventh embodiment. The members that have substantially the same function and structure are given the same reference numerals and the detailed descriptions thereof are omitted except for differences.

Figure 20:
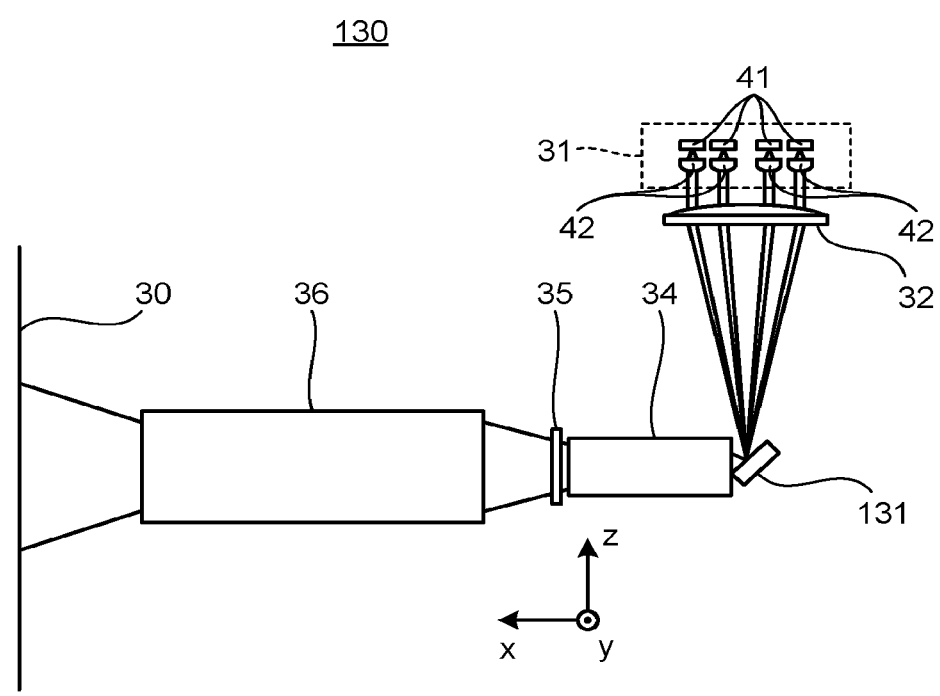
FIG. 20 is a schematic diagram illustrating the configuration of a pattern irradiation device according to a ninth embodiment of the present invention.

FIG. 20 is a schematic diagram illustrating the configuration of the pattern irradiation device 130 according to the ninth embodiment. The pattern irradiation device 130 includes the light emitting unit 31, the light condensing unit 32, a reflection fluorescent unit 131, the light tunnel 34, the image forming unit 35, and the irradiation optical system 36. The pattern irradiation device 130 is different from the seventh embodiment in that the reflection fluorescent unit 131 is included instead of the transmission fluorescent unit 111.

The light condensing unit 32 condenses the light output from the light emitting unit 31 on the reflection fluorescent unit 131. In the present embodiment, the light condensing unit 32 condenses the laser beams to substantially one point on the reflection fluorescent unit 131.

The reflection fluorescent unit 131 is a reflection-type fluorescent unit that emits fluorescence using the incident light as excitation light. The reflection fluorescent unit 131 receives the laser beams condensed by the light condensing unit 32 and emits fluorescence using the incident light as excitation light. The reflection fluorescent unit 131 then outputs the generated fluorescence to the light tunnel 34 arranged to face the surface that the light condensing unit 32 also faces. The reflection fluorescent unit 131 emits fluorescence from the surface to which the excitation light is input. The reflection fluorescent unit 131 is different from the transmission fluorescent unit 111 in that the fluorescence is emitted from the surface to which the excitation light is input. However, the other functions and effects are the same as those of the transmission fluorescent unit 111.

The light tunnel 34 receives the fluorescence emitted by the reflection fluorescent unit 131, uniformizes the brightness distribution thereof compared with that of the incident light, and outputs the resulting light. The light tunnel 34 can output light having the same angle as the output angle of the fluorescence emitted by the reflection fluorescent unit 131.

The reflection fluorescent unit 131, as an example, includes a reflection substrate and a fluorescent material provided on the reflection substrate. The light output from the light emitting unit 31 enters from the surface where the fluorescent material is provided. Consequently, the reflection fluorescent unit 131 can reflect the emitted fluorescence toward the light emitting unit 31. The reflection substrate reflects light having a bandwidth including the wavelength of laser beams and the wavelength of the light emitted from the fluorescent material. For example, a reflection coating film such as a derivative multilayer film or a metal film may be applied on the surface of the reflection substrate. As a result, the reflection substrate can increase the reflectivity.

The reflection fluorescent unit 131 may, for example, be a fluorescent ceramic. In this case, in the reflection fluorescent unit 131, the reflection coating film is applied on the surface (surface opposite to the surface facing the light emitting unit 31) opposite to the surface to which the light is input. Accordingly, the reflection fluorescent unit 131 can reflect the emitted fluorescence toward the light emitting unit 31. However, the reflection fluorescent unit 131 is not limited to this and may be of any form as long as it emits fluorescence using the light emitted from the light emitting unit 31 as excitation light and outputs the fluorescence from the surface to which the excitation light is input.

Figure 21:
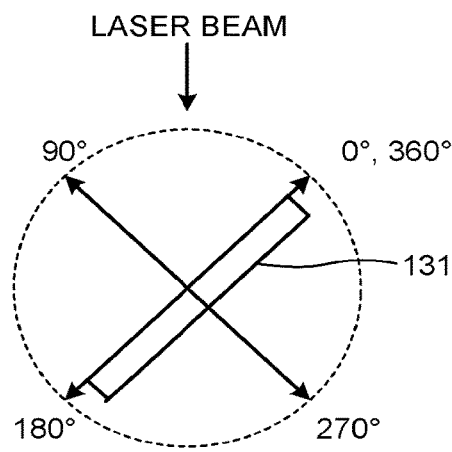
FIG. 21 is a side view of a reflection fluorescent unit.

FIG. 21 is a side view of the reflection fluorescent unit 131. The reflection fluorescent unit 131 generates fluorescence using an incident laser beam as excitation light. In this case, when the direction along the surface of the fluorescent material is 0 degrees (360 degrees) and 180 degrees, the reflection fluorescent unit 131 emits fluorescence in 360 degrees. The fluorescent material is arranged so as to incline at 45 degrees relative to the input direction of the laser beams. Accordingly, most of the fluorescence emitted from the surface to which the laser beams are input (in the direction in a range from 0 degrees to 180 degrees), is guided to the light tunnel 34. On the other hand, the fluorescence emitted from the surface opposite to the surface to which the laser beams are input (in the direction in a range from 180 degrees to 360 degrees) is reflected by the reflection substrate, and most of the fluorescence is guided to the light tunnel 34. The excitation light (laser beams) that has entered the fluorescent material but not converted to fluorescence is also reflected by the reflection substrate, emitted to the fluorescent material again, converted to fluorescence, and guided to the light tunnel 34. As a result, the reflection fluorescent unit 131 can efficiently convert the laser beams to fluorescence.

As described above, the pattern irradiation device 130 according to the present embodiment can remove speckle noise from an image pattern as well as reducing the size and cost thereof. The pattern irradiation device 130 according to the present embodiment can also obtain high optical output. The pattern irradiation device 130 according to the present embodiment, as in the second embodiment, can also achieve an output prevention mechanism of laser beams in a simple configuration, in case of the reflection fluorescent unit 131 being disengaged or broken.

The pattern irradiation device 130 according to the present embodiment may include the tapered light tunnel 61 illustrated in FIG. 9 instead of the light tunnel 34. Consequently, the pattern irradiation device 130 according to the present embodiment can obtain the same effects as those of the third embodiment.

The pattern irradiation device 130 according to the present embodiment may also include the prism 71 illustrated in FIG. 10 or a mirror. The light condensing unit 32 of the pattern irradiation device 130 according to the present embodiment may have the configuration as illustrated in FIG. 11, 12A, or 12B. Consequently, the pattern irradiation device 130 according to the present embodiment can obtain the same effects as those of the fourth embodiment.

When the light condensing unit 32 has the configuration as illustrated in FIG. 12B, the incidence angle of the light condensed on the reflection fluorescent unit 131 becomes small. Accordingly, even if the distance between the lens 73 and the reflection fluorescent unit 131 is short, the rays of light output from the lens 73 are efficiently guided to the surface of the reflection fluorescent unit 131, without being blocked by the side surfaces of the tapered light tunnel 61 or the reflection fluorescent unit 131. Consequently, when the light condensing unit 32 has the configuration as illustrated in FIG. 12B, the pattern irradiation device 130 can shorten the distance between the lens 73 and the reflection fluorescent unit 131, and also can reduce the size of the entire device. By reducing the size of the device, the pattern irradiation device 130 can also reduce tolerance deviations of the excitation light on the irradiation position relative to the reflection fluorescent unit 131. As a result, the pattern irradiation device 130 can reduce the size of the light emitting area on the reflection fluorescent unit 131. As a result, the pattern irradiation device 130 can efficiently guide the fluorescence to the tapered light tunnel 61 and also achieve high output.

The light condensing unit 32 in the pattern irradiation device 130 according to the present embodiment may have the optical configuration as illustrated in FIGS. 13 and 14. Consequently, the pattern irradiation device 130 according to the present embodiment can obtain the same effects as those of the fifth embodiment.

The light condensing unit 32 in the pattern irradiation device 130 according to the present embodiment may have the optical configuration as illustrated in FIGS. 15 and 16. Consequently, the pattern irradiation device 130 according to the present embodiment can obtain the same effects as those of the sixth embodiment.

Tenth Embodiment

A pattern irradiation device 140 according to a tenth embodiment will now be described. The pattern irradiation device 140 according to the tenth embodiment has substantially the same function and structure as those of the pattern irradiation device 130 according to the ninth embodiment. The members that have substantially the same function and structure are given the same reference numerals and the detailed descriptions thereof are omitted except for differences.

Figure 22:
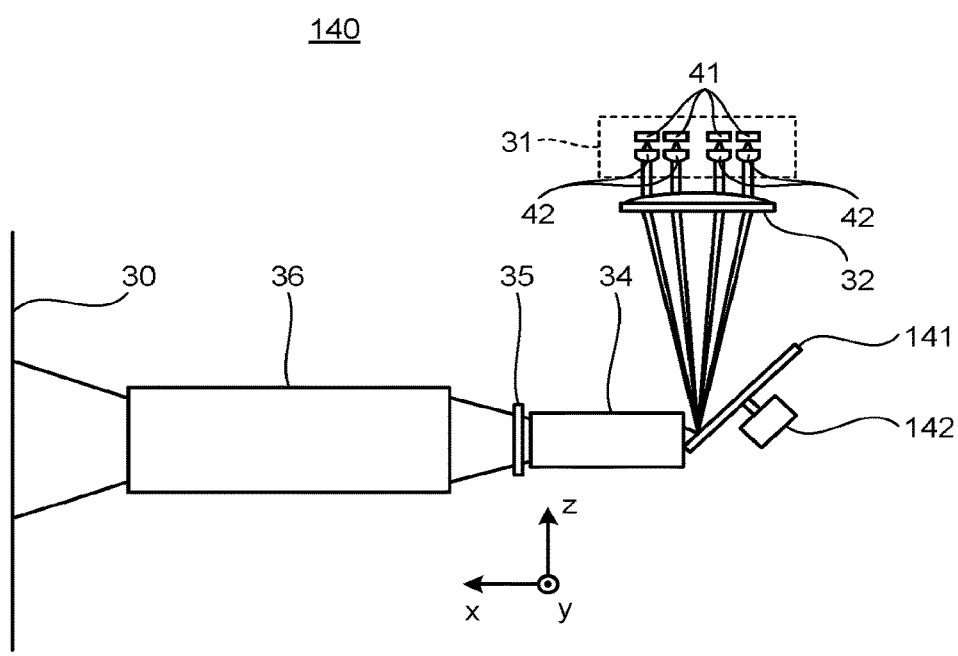
FIG. 22 is a schematic diagram illustrating the configuration of a pattern irradiation device according to a tenth embodiment of the present invention.

FIG. 22 is a schematic diagram illustrating the configuration of the pattern irradiation device 140 according to the tenth embodiment of the present invention. The pattern irradiation device 140 includes the light emitting unit 31, the light condensing unit 32, a movable reflection fluorescent unit 141, a second driving unit 142, the light tunnel 34, the image forming unit 35, and the irradiation optical system 36. The pattern irradiation device 140 is different from the ninth embodiment in that it includes the movable reflection fluorescent unit 141 and the second driving unit 142 instead of the reflection fluorescent unit 131.

The movable reflection fluorescent unit 141 is a reflection-type fluorescent unit that can change the portion at which the light is emitted. The movable reflection fluorescent unit 141 receives the laser beams condensed by the light condensing unit 32 and emits fluorescence using the incident light as excitation light. The movable reflection fluorescent unit 141 then outputs the generated fluorescence to the light tunnel 34 arranged to face the side that the light condensing unit 32 faces. The second driving unit 142 changes the portion at which the light is emitted on the movable reflection fluorescent unit 141.

The movable reflection fluorescent unit 141 may have substantially the same configuration as that illustrated in FIG. 19. More specifically, the movable reflection fluorescent unit 141, for example, includes the substrate 123 and the fluorescent material 124. In this case, the substrate 123 is a member that reflects light, and for example, a reflection coating film such as a derivative multilayer film or a metal film is applied on the surface. The fluorescent material 124 is provided at the periphery of the substrate 123 in a ring shape, and light is input to the surface opposite to the surface facing the substrate 123.

However, the configuration of the movable reflection fluorescent unit 141 is not limited to the one in which the ring-shaped fluorescent material 124 is rotatably arranged. For example, the movable reflection fluorescent unit 141 may include a long fluorescent material 124 provided so as to move back and forth along the longitudinal direction. The movable reflection fluorescent unit 141 may also include a polygonal fluorescent material 124 or an ellipse fluorescent material 124. The movable reflection fluorescent unit 141 may include a fluorescent ceramic instead of the substrate 123 and the fluorescent material 124. In this case, in the movable reflection fluorescent unit 141, a reflection coating film is applied on the surface (surface opposite to the surface facing the light emitting unit 31) opposite to the surface to which the light is input.

In this manner, the pattern irradiation device 140 according to the tenth embodiment can change the portion at which the light is emitted on the movable reflection fluorescent unit 141. Accordingly, the pattern irradiation device 140 according to the tenth embodiment can obtain high optical output and can also prevent deterioration, which can be caused by continuously and intensely emitting the laser beams on the same portion of the movable reflection fluorescent unit 141.

Eleventh Embodiment

A pattern irradiation device 150 according to an eleventh embodiment will now be described. The pattern irradiation device 150 according to the eleventh embodiment has substantially the same function and structure as those of the pattern irradiation device 70 according to the fourth embodiment. The members that have substantially the same function and structure are given the same reference numerals and the detailed descriptions thereof are omitted except for differences.

Figure 23:
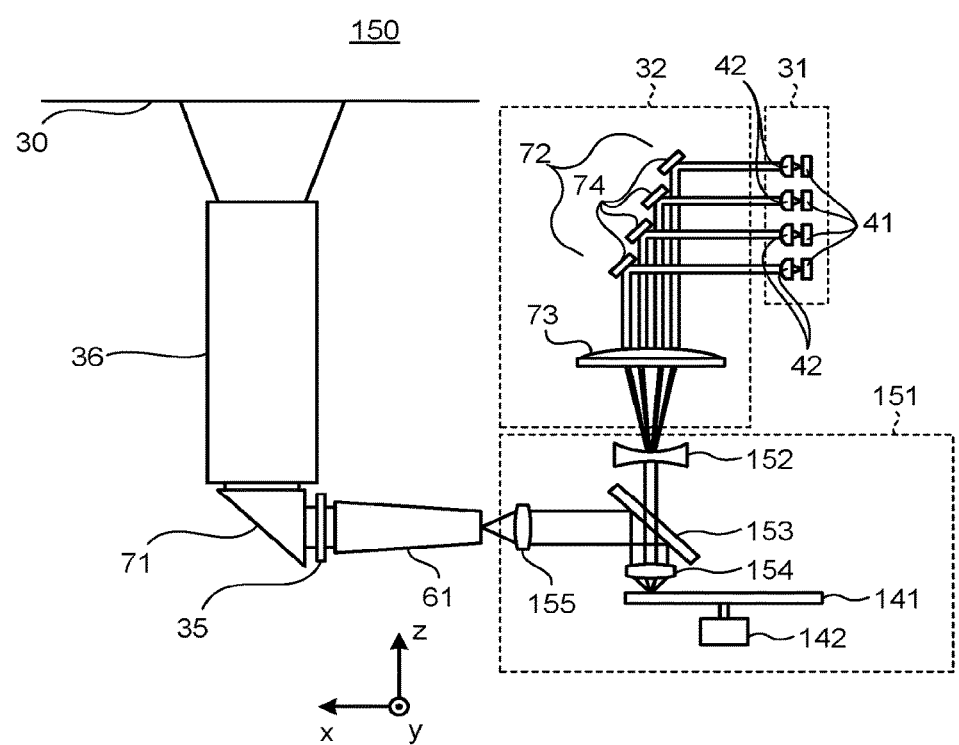
FIG. 23 is a schematic diagram illustrating the configuration of a pattern irradiation device according to an eleventh embodiment of the present invention.

FIG. 23 is a schematic diagram illustrating the configuration of the pattern irradiation device 150 according to the eleventh embodiment of the present invention. The pattern irradiation device 150 includes the light emitting unit 31, the light condensing unit 32, a reflection fluorescent optical system 151, the tapered light tunnel 61, the image forming unit 35, the prism 71, and the irradiation optical system 36. The pattern irradiation device 150 is different from the fourth embodiment in that it includes the reflection fluorescent optical system 151 instead of the reflection diffusion plate 51.

The reflection fluorescent optical system 151 is an optical system that includes a reflection-type fluorescent unit that emits fluorescence using the incident light as excitation light. The reflection fluorescent optical system 151 receives a plurality of laser beams condensed by the light condensing unit 32 and emits fluorescence using the incident light as excitation light. The reflection fluorescent optical system 151 then outputs the generated fluorescence to the tapered light tunnel 61 arranged to face the side that the light condensing unit 32 faces. In the reflection fluorescent optical system 151 configured in this manner, the optical axis of the laser beams input from the light condensing unit 32 and the optical axis of the fluorescence output to the tapered light tunnel 61 are substantially perpendicular to each other.

The reflection fluorescent optical system 151 includes the movable reflection fluorescent unit 141, the second driving unit 142, a concave lens 152, a dichroic mirror 153, a first condenser lens 154, and a second condenser lens 155.

The movable reflection fluorescent unit 141 and the second driving unit 142 have the same configuration as those in the tenth embodiment. In other words, the movable reflection fluorescent unit 141 is a reflection-type fluorescent unit that can change the portion at which the light is emitted. The second driving unit 142 changes the portion at which the light is emitted on the movable reflection fluorescent unit 141. The movable reflection fluorescent unit 141 also outputs the generated fluorescence from the surface to which the excitation light is input.

The concave lens 152 receives the laser beams condensed by the light condensing unit 32, and outputs them as substantially parallel beams. The laser beams output from the concave lens 152 enter the dichroic mirror 153.

The dichroic mirror 153 transmits the light in the wavelength range of the laser beams output from the light emitting unit 31, and reflects the light in the wavelength range of the fluorescence emitted from the movable reflection fluorescent unit 141. For example, if the laser beams are blue and the fluorescence is yellow, the dichroic mirror 153 transmits the light in the blue wavelength range and reflects the light in the yellow wavelength range.

The dichroic mirror 153 receives the laser beams, which are substantially parallel beams, output from the concave lens 152. The dichroic mirror 153 then transmits the laser beams, which are substantially parallel beams, output from the concave lens 152.

The first condenser lens 154 receives the laser beams, which are substantially parallel beams, output from the concave lens 152 and transmitted through the dichroic mirror 153. The first condenser lens 154 condenses the received laser beams on the movable reflection fluorescent unit 141.

The movable reflection fluorescent unit 141 then emits fluorescence using the laser beams condensed by the first condenser lens 154 as excitation light. The fluorescence emitted by the movable reflection fluorescent unit 141 returns along the original path, passes through the first condenser lens 154, and reaches the dichroic mirror 153.

The dichroic mirror 153 reflects the fluorescence emitted by the movable reflection fluorescent unit 141 toward the second condenser lens 155. The second condenser lens 155 condenses the fluorescence from the dichroic mirror 153 into the input port 64 of the tapered light tunnel 61. The fluorescence that has passed through the tapered light tunnel 61 is emitted on the projection plane 30 via the image forming unit 35, the prism 71, and the irradiation optical system 36.

In the pattern irradiation device 150 according to the present embodiment, the laser beams are input perpendicular to the fluorescent material 124 of the movable reflection fluorescent unit 141. Accordingly, the size of the optical spot formed on the fluorescent material 124 of the movable reflection fluorescent unit 141 can be reduced. Because the first condenser lens 154 can efficiently capture the fluorescence that emits light with a substantially Lambert distribution, it can achieve high output.

The pattern irradiation device 150 according to the present embodiment may include the reflection fluorescent unit 131 indicated in the ninth embodiment instead of the movable reflection fluorescent unit 141. Because the pattern irradiation device 150 includes the concave lens 152 and the first condenser lens 154, it can improve the transmission efficiency by making the light that enters the dichroic mirror 153 into substantially parallel beams. However, the pattern irradiation device 150 may have a configuration without the concave lens 152 and the first condenser lens 154, and have the light condensing unit 32 condense the laser beams on the movable reflection fluorescent unit 141. In this case, the dichroic mirror 153 is interposed between the light condensing unit 32 and the movable reflection fluorescent unit 141.

The light condensing unit 32 in the pattern irradiation device 150 according to the present embodiment may have the optical configuration as illustrated in FIGS. 13 and 14. Consequently, the pattern irradiation device 150 according to the present embodiment can have the same effects as those in the fifth embodiment.

The light condensing unit 32 in the pattern irradiation device 150 according to the present embodiment may have the optical configuration as illustrated in FIGS. 15 and 16. Consequently, the pattern irradiation device 150 according to the present embodiment can have the same effects as those in the sixth embodiment.

According to an embodiment, it is possible to obtain high optical output as well as reduce the size and the cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A pattern irradiation device that irradiates an object with an image in a predetermined pattern, comprising:
an illumination apparatus including:
a light emitting unit that outputs light;
a light condensing unit that condenses the light output from the light emitting unit;
a diffusion unit that diffuses the light condensed by the light condensing unit; and
a uniformizing optical system that receives the light diffused by the diffusion unit, uniformizes a brightness distribution thereof compared with that of the light being received, and outputs the resulting light,
an image forming unit that transmits light output from the illumination apparatus according to a predetermined image pattern, and
an irradiation optical system that irradiates the object with the light transmitted through the image forming unit.

2. The pattern irradiation device according to claim 1, wherein the light emitting unit includes a plurality of light sources that output light in a same direction with one another.

3. The pattern irradiation device according to claim 2, wherein each of the light sources is a laser diode.

4. The pattern irradiation device according to claim 1, wherein the light condensing unit is a lens that condenses the light output from the light emitting unit.

5. The pattern irradiation device according to claim 1, wherein the diffusion unit is a transmission diffusion plate.

6. The pattern irradiation device according to claim 1, wherein the diffusion unit is a reflection diffusion plate.

7. The pattern irradiation device according to claim 6, wherein the reflection diffusion plate includes a transmission diffusion surface formed on a side facing the light emitting unit and a reflection surface formed on a side opposite to the side facing the light emitting unit.

8. The pattern irradiation device according to claim 1, wherein
the uniformizing optical system is a light tunnel that includes an optical path having a reflecting side surface configured to reflect the light inward, and
the light tunnel receives the light from an input port of the optical path, transmits the light through the optical path, and outputs the light from an output port of the optical path.

9. The pattern irradiation device according to claim 8, wherein the light tunnel has the output port larger than the input port, and the reflecting side surface tilted relative to an optical axis of the optical path.

10. The pattern irradiation device according to claim 1, wherein
the light emitting unit includes a plurality of light sources, and
the light emitting unit further includes collimator lenses provided corresponding to respective light sources, and the collimator lenses make light output from the respective light sources into parallel luminous fluxes.

11. The pattern irradiation device according to claim 10, wherein
the light condensing unit includes:
a mirror group that reflects a plurality of luminous fluxes output from the light emitting unit; and
a lens that condenses the luminous fluxes reflected by the mirror group, and
the mirror group reflects a plurality of beams of light output from the light emitting unit so as to narrow a luminous flux width formed by the luminous fluxes output from the light emitting unit in a same direction, and guides the resulting light to the light condensing unit.

12. The pattern irradiation device according to claim 10, wherein the light condensing unit includes:
a mirror group that reflects a plurality of luminous fluxes output from the light emitting unit in a same direction, and condenses the luminous fluxes in a first direction perpendicular to an optical axis by reflection angles; and
a lens that is provided after the mirror group and condenses the luminous fluxes in a second direction perpendicular to the first direction.

13. The pattern irradiation device according to claim 10, wherein the light condensing unit is a mirror group that reflects a plurality of luminous fluxes output from the light emitting unit in a same direction, and condenses the resulting light by reflection angles.

14. The pattern irradiation device according to claim 1, wherein
the pattern irradiation device is disposed within a system; and
the system includes a three-dimensional measuring device that measures a distance to an object irradiated with light by the pattern irradiation device.

15. The pattern irradiation device according to claim 14, wherein the system further includes:
a robot that handles the object;
a recognizing device that recognizes a position and a posture of the object based on the distance to the object measured by the three-dimensional measuring device; and
a robot controller that controls an operation of the robot based on the position and the posture of the object recognized by the recognizing device to cause the robot to handle the object.

16. An illumination apparatus, comprising:
a light emitting unit that outputs light;
a light condensing unit that condenses the light output from the light emitting unit;
a fluorescent unit that emits light by using the light condensed by the light condensing unit as excitation light; and
a uniformizing optical system that receives the light emitted by the fluorescent unit, uniformizes a brightness distribution thereof compared with that of the light being received, and outputs the resulting light.

17. The illumination apparatus according to claim 16, wherein the fluorescent unit is a transmission fluorescent unit.

18. The illumination apparatus according to claim 16, wherein the fluorescent unit is a reflection fluorescent unit.

19. The illumination apparatus according to claim 16, wherein the fluorescent unit is capable of changing a portion at which the light is emitted.

20. An illumination apparatus, comprising:
a light emitting unit that outputs light;
a light condensing unit that condenses the light output from the light emitting unit;
a diffusion unit that diffuses the light condensed by the light condensing unit; and
a uniformizing optical system that receives the light diffused by the diffusion unit, uniformizes a brightness distribution thereof compared with that of the light being received, and outputs the resulting light,
wherein the diffusion unit is a reflection diffusion plate.

* * * * *